US012181168B2

(12) United States Patent
Bak et al.

(10) Patent No.: US 12,181,168 B2
(45) Date of Patent: Dec. 31, 2024

(54) AIR CONDITIONER AND CONTROL METHOD THEREOF

(71) Applicant: SAMSUNG ELECTRONICS CO., LTD., Suwon-si (KR)

(72) Inventors: Jongwon Bak, Suwon-si (KR); Taeil Kim, Suwon-si (KR); Hyunkook Kim, Suwon-si (KR); Sangyoon Han, Suwon-si (KR); Changhee Han, Suwon-si (KR); Jejin Lee, Suwon-si (KR); Byoungguk Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 999 days.

(21) Appl. No.: 17/006,142

(22) Filed: Aug. 28, 2020

(65) Prior Publication Data

US 2021/0063042 A1 Mar. 4, 2021

(30) Foreign Application Priority Data

Aug. 30, 2019 (KR) .................. 10-2019-0107714

(51) Int. Cl.
*F24F 11/77* (2018.01)
*F24F 1/0063* (2019.01)
(Continued)

(52) U.S. Cl.
CPC ............ *F24F 11/77* (2018.01); *F24F 1/0063* (2019.02); *F24F 1/10* (2013.01); *F24F 1/16* (2013.01);
(Continued)

(58) Field of Classification Search
CPC .. F24F 11/77; F24F 1/0063; F24F 1/10; F24F 1/16; F24F 1/32; F24F 13/30;
(Continued)

(56) References Cited

U.S. PATENT DOCUMENTS

| 4,936,107 A | 6/1990 | Kitagaki et al. |
| 2014/0245764 A1 | 9/2014 | Kibo |

(Continued)

FOREIGN PATENT DOCUMENTS

| EP | 2 410 257 A1 | 1/2012 |
| JP | 08-152208 | 6/1996 |

(Continued)

OTHER PUBLICATIONS

Office Action dated Nov. 20, 2023, in Korean Application No. 10-2019-0107714.

(Continued)

*Primary Examiner* — Kun Kai Ma
(74) *Attorney, Agent, or Firm* — STAAS & HALSEY LLP

(57) ABSTRACT

An air conditioner and control method for reducing power consumption by controlling pressure or temperature of a refrigerant. The air conditioner includes a compressor compressing a refrigerant and discharging a high pressure refrigerant gas; an outdoor heat exchanger in which the high pressure refrigerant gas is changed to a refrigerant fluid; an outdoor fan to blow outdoor air to the outdoor heat exchanger; a decompressor decompressing the refrigerant fluid into a low pressure state; an indoor heat exchanger changing the decompressed low pressure refrigerant fluid to a refrigerant gas; and a controller configured to control pressure or temperature of the refrigerant based on an operation condition including at least two of a first condition determined based on an installation environment, a second condition determined based on an optimal compression ratio of the compressor, a third condition determined based on outdoor temperature, and a fourth condition set as a default value.

19 Claims, 19 Drawing Sheets

(51) Int. Cl.
  *F24F 1/10*    (2011.01)
  *F24F 1/16*    (2011.01)
  *F24F 1/32*    (2011.01)
  *F24F 11/46*   (2018.01)
  *F24F 13/30*   (2006.01)
  *F24F 140/12*  (2018.01)
  *F24F 140/20*  (2018.01)

(52) U.S. Cl.
  CPC ............... *F24F 1/32* (2013.01); *F24F 13/30* (2013.01); *F24F 11/46* (2018.01); *F24F 2140/12* (2018.01); *F24F 2140/20* (2018.01)

(58) Field of Classification Search
  CPC .. F24F 2140/20; F24F 2140/12; F24F 1/0003; F24F 11/86; F24F 11/871; F25B 2313/0294; F25B 2700/1931; F25B 2700/1933
  See application file for complete search history.

(56) References Cited

U.S. PATENT DOCUMENTS

| | | |
|---|---|---|
| 2015/0338111 A1 | 11/2015 | Havard et al. |
| 2016/0320110 A1 | 11/2016 | Ishida et al. |
| 2018/0087797 A1 | 3/2018 | Han et al. |
| 2018/0347878 A1 | 12/2018 | Son et al. |

FOREIGN PATENT DOCUMENTS

| | | | | |
|---|---|---|---|---|
| JP | H08189709 | A | * | 7/1996 |
| JP | 2005-121359 | A | | 5/2005 |
| JP | 3719366 | B2 | * | 11/2005 |
| JP | 4905447 | B2 | | 3/2012 |
| JP | 2015-124893 | | | 7/2015 |
| JP | WO2018/047238 | | | 3/2018 |
| JP | 2019138499 | A | * | 8/2019 |
| JP | 2019-156354 | | | 9/2019 |
| KR | 1997-0062583 | | | 9/1997 |
| KR | 2000-0055119 | | | 9/2000 |
| KR | 2003-0040332 | | | 5/2003 |
| KR | 10-2005-0038115 | | | 4/2005 |
| KR | 10-2006-0066439 | | | 6/2006 |
| KR | 10-0733313 | B1 | | 6/2007 |
| KR | 10-2012-0048092 | | | 5/2012 |
| KR | 10-2014-0112681 | | | 9/2014 |
| KR | 20150016407 | A | * | 2/2015 |
| KR | 10-2018-0006672 | | | 1/2018 |
| WO | WO 95/09335 | | | 4/1995 |

OTHER PUBLICATIONS

Office Action dated Feb. 2, 2024, in Korean Application No. 10-2019-0107714.
International Search Report mailed on Dec. 30, 2020 for International Application No. PCT/KR2020/011471.
Extended European Search Report dated Aug. 9, 2022 for European Application No. 20858917.6.

* cited by examiner

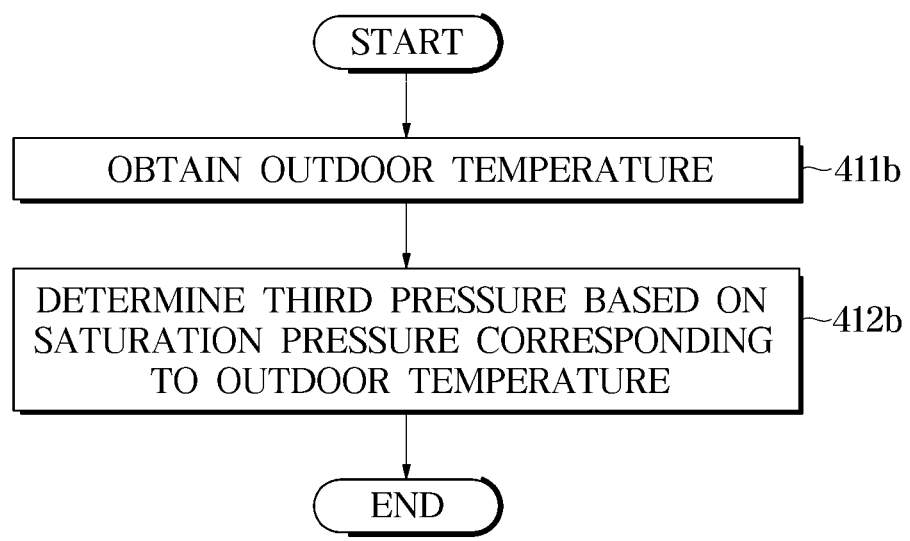

AIR CONDITIONER AND CONTROL METHOD THEREOF

CROSS-REFERENCE TO RELATED APPLICATION

This application is based on and claims priority under 35 U. S. C. § 119 to Korean Patent Application No. 10-2019-0107714 filed on Aug. 30, 2019, the disclosure of which is incorporated herein by reference in its entirety.

BACKGROUND

1. Field of the Invention

The disclosure relates to an air conditioner capable of cooling operation and control method thereof.

2. Discussion of Related Art

An air conditioner is a device including an outdoor unit where heat is exchanged between outdoor air and a refrigerant and an indoor unit where heat is exchanged between indoor air and the refrigerant, for cooling or heating the room using the migration of heat produced in the process of evaporation and condensation while the refrigerant circulates in a heat pump cycle comprised of compression, condensation, decompression, and evaporation.

For normal operation of the air conditioner, a certain level or higher of refrigerant pressure needs to be secured, but as the refrigerant pressure to be controlled is higher, the power consumption of the outdoor unit increases and operation efficiency decreases. Accordingly, appropriate control over the refrigerant pressure taking into account both reliability in performance of the air conditioner and operation efficiency is required.

SUMMARY OF THE INVENTION

The disclosure provides an air conditioner and control method thereof for reducing power consumption and improving operation efficiency by controlling pressure or temperature of a refrigerant taking into account various operation conditions.

According to an embodiment of the disclosure, an air conditioner includes a compressor compressing a refrigerant and discharging a high pressure refrigerant gas; an outdoor heat exchanger in which the high pressure refrigerant gas is changed to a refrigerant fluid; an outdoor fan installed near the outdoor heat exchanger and performing blowing; a decompressor decompressing the refrigerant fluid into a low pressure state; an indoor heat exchanger changing the decompressed low pressure refrigerant fluid to a refrigerant gas; and a controller configured to control pressure or temperature of the refrigerant based on an operation condition including two or more of a first condition determined based on an installation environment, a second condition determined based on an optimal compression ratio of the compressor, a third condition determined based on outdoor temperature, or a fourth condition set as a default value.

The first condition may include a first pressure or first temperature of the refrigerant determined based on the installation environment, the second condition may include a second pressure or second temperature of the refrigerant determined based on the optimal compression ratio of the compressor, the third condition may include a third pressure or third temperature of the refrigerant determined based on the outdoor temperature, and the fourth condition may include a fourth pressure or fourth temperature set as the default value.

The controller may set a highest pressure or temperature of the pressure condition to be a target pressure or target temperature, and based on the target pressure or target temperature, control high pressure or condensation temperature of the refrigerant.

The controller may control the outdoor fan to control pressure or temperature of the refrigerant.

The air conditioner may further include an outdoor fan motor providing rotational force to the outdoor fan, and the controller may transmit a control signal to the outdoor fan motor to control the number of revolutions of the outdoor fan based on the operation condition.

The controller may transmit a control signal to the outdoor fan motor to increase the number of revolutions of the outdoor fan when current pressure or temperature of the refrigerant is higher than the highest value of the operation condition.

The air conditioner may further include a high pressure sensor measuring the current pressure of the refrigerant, and the controller may transmit a control signal to the outdoor fan motor to increase the number of revolutions of the outdoor fan when pressure of the refrigerant measured by the high pressure sensor is higher than the highest value of the operation condition.

The air conditioner may further include a refrigerant temperature sensor measuring temperature of a refrigerant passing the outdoor heat exchanger, and the controller may obtain current pressure of the refrigerant based on the temperature of the refrigerant measured by the refrigerant temperature sensor.

The air conditioner may further include a refrigerant temperature sensor measuring temperature of a refrigerant passing the outdoor heat exchanger, and the controller may transmit a control signal to the outdoor fan motor to increase the number of revolutions of the outdoor fan when the temperature of the refrigerant measured by the refrigerant temperature sensor is higher than the highest value of the operation condition.

The first condition determined based on the installation environment may be determined based on the installation environment including at least one of a type of the refrigerant, length of a connection pipe connecting an indoor unit to an outdoor unit, or a different in level between the outdoor unit and the indoor unit.

The second condition determined based on the optimal compression ratio of the compressor may be determined based on a minimum compression ratio defining an optimal compression ratio of the compressor and low pressure of the refrigerant.

The second condition determined based on the optimal compression ratio of the compressor may be determined based on a value obtained by adding a compensation coefficient to the minimum compression ratio and the low pressure of the refrigerant.

The second condition determined based on the optimal compression ratio of the compressor may be determined by adding a compensation coefficient to a minimum high pressure determined based on the minimum compression ratio and the low pressure of the refrigerant.

The third condition determined based on the outdoor temperature may be determined by adding a compensation coefficient to saturation pressure corresponding to the outdoor temperature.

The third condition determined based on the outdoor temperature may include saturation pressure corresponding to a temperature obtained by adding a compensation coefficient to the outdoor temperature.

According to another embodiment of the disclosure, a control method of an air conditioner including a compressor compressing a refrigerant and discharging a high pressure refrigerant gas, an outdoor heat exchanger changing the high pressure refrigerant gas to a refrigerant fluid, and an outdoor fan installed near the outdoor heat exchanger includes determining an operation condition including two or more of a first condition determined based on an installation environment of the air conditioner, a second condition determined based on an optimal compression ratio of the compressor, a third condition determined based on outdoor temperature, or a fourth condition set as a default value; setting a highest value of the operation condition to be a target condition; and controlling pressure or temperature of the refrigerant based on the target condition.

The controlling of the pressure of the refrigerant may include obtaining current pressure of the refrigerant; and controlling the outdoor fan based on the current pressure of the refrigerant and the target condition.

The controlling of the outdoor fan may include increasing the number of revolutions of the outdoor fan when the current pressure of the refrigerant is higher than the target condition.

The obtaining of the current pressure of the refrigerant may include measuring current pressure of the refrigerant using a pressure sensor provided between the compressor and the outdoor heat exchanger.

The obtaining of the current pressure of the refrigerant may include measuring temperature of the refrigerant passing the outdoor heat exchanger using a refrigerant temperature sensor; and obtaining current pressure of the refrigerant based on the temperature of the refrigerant measured by the refrigerant temperature sensor.

The controlling of the temperature of the refrigerant may include measuring temperature of the refrigerant passing the outdoor heat exchanger using a refrigerant temperature sensor; and increasing the number of revolutions of the outdoor fan when the measured temperature of the refrigerant is higher than the target condition.

The determining of the operation condition may include determining the first condition based on the installation environment including at least one of a type of the refrigerant, length of a connection pipe connecting an indoor unit to an outdoor unit, or a different in level between the outdoor unit and the indoor unit.

The determining of the operation condition may include determining the second condition based on a minimum compression ratio defining an optimal compression ratio of the compressor and low pressure of the refrigerant.

The determining of the second condition may include determining the second condition based on a value obtained by adding a compensation coefficient to the minimum compression ratio and the low pressure of the refrigerant.

The determining of the second condition may include determining the second condition by adding a compensation coefficient to a minimum high pressure determined based on the minimum compression ratio and the low pressure of the refrigerant.

The determining of the operation condition may include determining the third condition by adding a compensation coefficient to saturation pressure corresponding to the outdoor temperature.

The determining of the operation condition may include determining saturation pressure corresponding to a temperature obtained by adding a compensation coefficient to the outdoor temperature.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 19 is a detailed flowchart of a process of determining third pressure related to an operating environment of an air conditioner in a control method of the air conditioner, according to an embodiment of the disclosure.

DETAILED DESCRIPTION OF EXEMPLARY EMBODIMENTS

Figure 1:
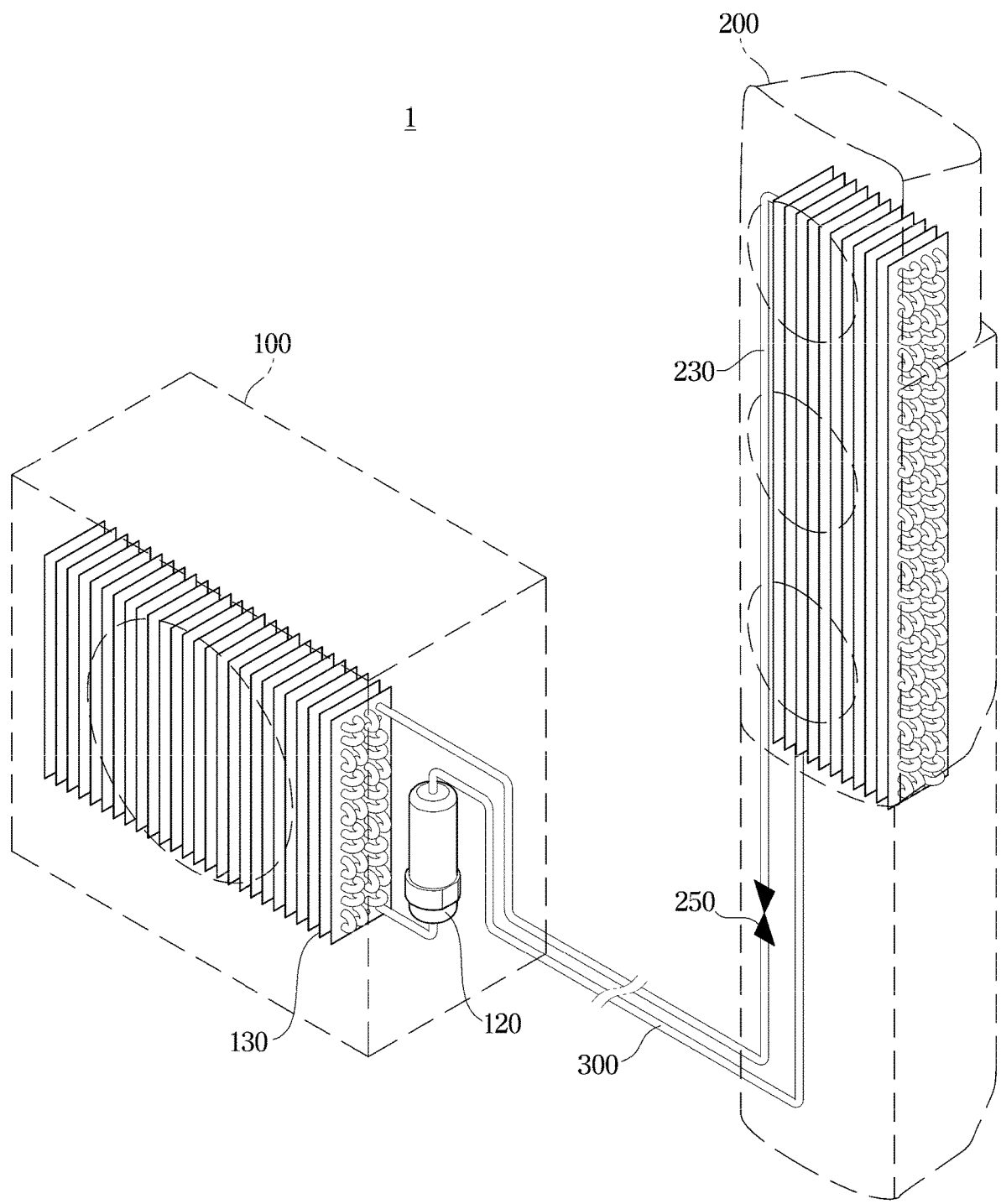
FIG. 1 shows the exterior of an outdoor unit and an indoor unit of an air conditioner, according to an embodiment of the disclosure.

Like numerals refer to like elements throughout the specification. Not all elements of embodiments of the disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, an expression that a component controls another component refers not only to the component directly transmitting a control signal to the other component, but also to the component controlling the other component by transmitting a control signal to a third component to provides power to the other component.

Furthermore, when a component is mentioned to send or transmit a signal to another component, it does not exclude a possibility of an intermediate component that exists between the two components, through which to send or transmit the signal, unless otherwise mentioned.

It is to be understood that the singular forms "a," "an," and "the" include plural references unless the context clearly dictates otherwise.

The term with an ordinal number, such as 'first', 'second', etc., is used to distinguish multiple components or information items from one another, without intending to define the order of them.

Reference numerals used for method steps are just used to identify the respective steps, but not to limit an order of the steps. Thus, unless the context clearly dictates otherwise, the written order may be practiced otherwise.

Embodiments of an air conditioner and control method thereof will now be described in detail with reference to accompanying drawings.

Figure 2:
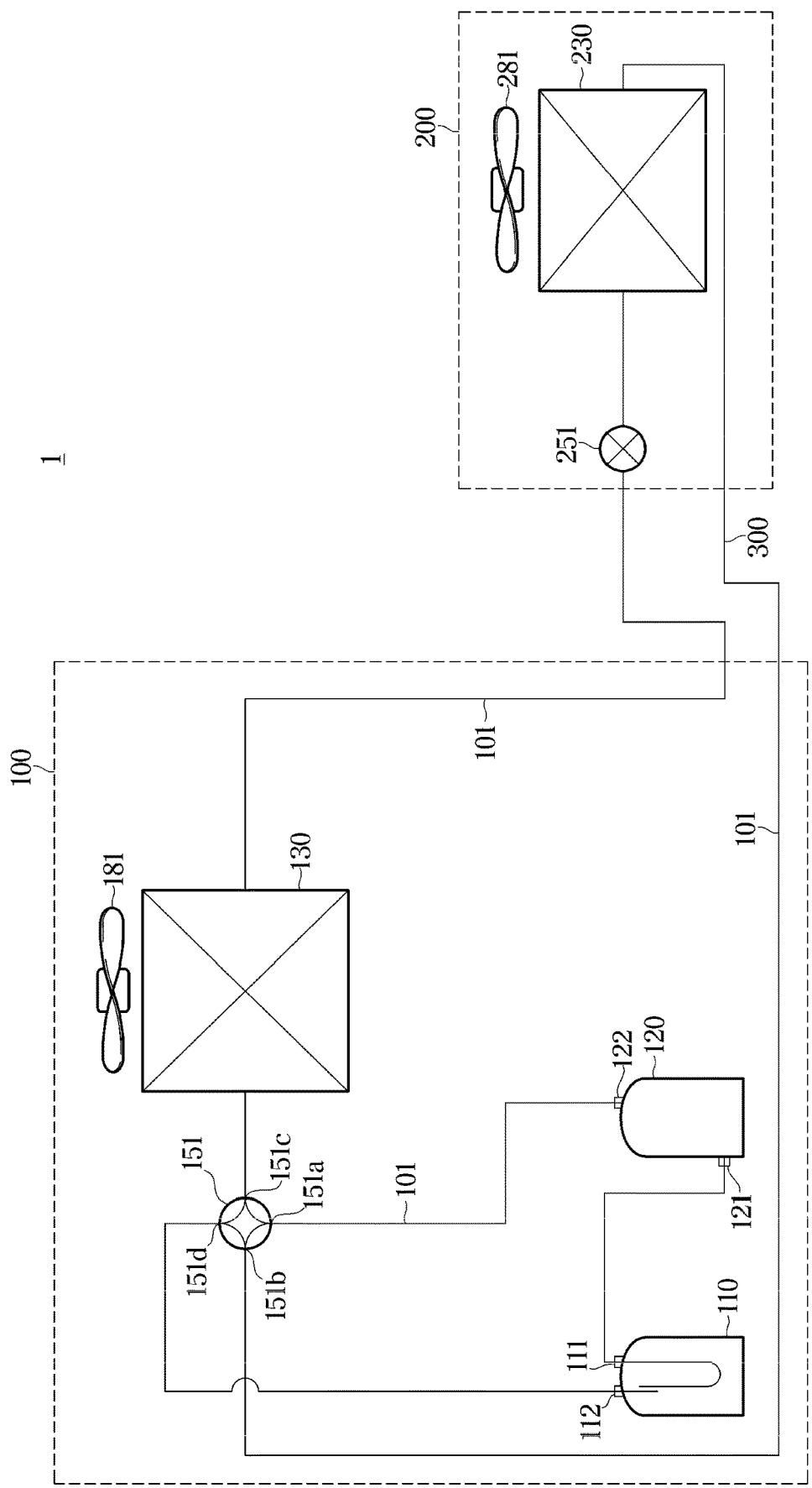
FIG. 2 shows configurations of an outdoor unit and an indoor unit of an air conditioner, according to an embodiment of the disclosure.

FIG. 1 shows the exterior of an outdoor unit and an indoor unit of an air conditioner, according to an embodiment of the disclosure, and FIG. 2 shows configurations of an outdoor unit and an indoor unit of an air conditioner, according to an embodiment of the disclosure.

Referring to FIG. 1, in an embodiment of the disclosure, an air conditioner 1 may include an outdoor unit 100 where heat is exchanged between outdoor air and a refrigerant and an indoor unit 200 where heat is exchanged between indoor air and a refrigerant. The outdoor unit 100 and the indoor unit 200 may be connected through a connecting pipe 300, forming a heat pump cycle comprised of compression, condensation, decompression, and evaporation. The heat pump cycle may include a cooling cycle for cooling operation of the air conditioner 1 and a heating cycle for heating operation of the air conditioner 1.

Using the migration of heat produced in the process of evaporation and condensation while the refrigerant circulates in the heat pump cycle, the room with the indoor unit 200 installed therein may be cooled down or heated.

The outdoor unit 100 may include a compressor 120 for compressing the refrigerant and an outdoor heat exchanger 130 for exchanging heat between the refrigerant and outdoor air, and the indoor unit 200 may include a decompressor 250 for decompressing the refrigerant and an indoor heat exchanger 230 for exchanging heat between the refrigerant and indoor air. Depending on the product structure, it is possible for the decompressor 250 to be provided in the outdoor unit 100.

The air conditioner 1 may perform cooling operation. When the air conditioner 1 performs the cooling operation, the outdoor heat exchanger 130 operates as a condenser and the indoor heat exchanger 230 operates as an evaporator.

It is possible that the air conditioner 1 is capable of performing both cooling operation and heating operation. When cooling mode is selected, the air conditioner 1 may perform the cooling operation, and when heating mode is selected, the air conditioner 1 may perform the heating operation. Selection between the cooling mode and the heating mode may be made by an input of the user, or may be automatically made based on a set temperature and a current temperature. When the air conditioner 1 performs the heating operation, the outdoor heat exchanger 130 may operate as the evaporator, and the indoor heat exchanger 230 may operate as the condenser.

Although in this example the air conditioner 1 includes one outdoor unit 100 and one indoor unit 200, it is not limited thereto. It is also possible that the air conditioner may be implemented as a multi-type air conditioner in which one outdoor unit 100 is connected to a plurality of indoor units 200 or a plurality of outdoor units 100 are connected to a plurality of indoor units 200.

Referring to FIG. 2, the outdoor unit 100 may include the compressor 120 for compressing a low temperature and low pressure refrigerant sucked in through a sucking port 121 to a high temperature and high pressure refrigerant and discharging the high temperature and high pressure refrigerant through a discharging port 122. For example, the compressor 120 may be implemented as a rotary compressor or a scroll compressor.

In an embodiment of the disclosure, a refrigerant used in the air conditioner 1 may be a hydrofluorocarbon (HFC) series refrigerant. For example, an R32 refrigerant or a mixed refrigerant including the R32 refrigerant may be used, and for the mixed refrigerant including the R32 refrigerant, an R410A refrigerant may be used. It is not, however, limited thereto, and other various types of refrigerant may be used.

A refrigerant pipe 101 may have one end connected to the discharging port 122 of the compressor 120 and the other end connected to a flow path switching valve 151. For example, the flow path switching valve 151 may be implemented with a four-way valve, which may form a refrigerant flow path required for operation in the corresponding mode by switching flows of the refrigerant discharged from the compressor 120 depending on the operation mode (cooling mode or heating mode).

The flow path switching valve 151 may include a first port 151a connected to the discharging port 122 of the compressor 120, a second port 151b connected to the indoor heat exchanger 230, a third port 151c connected to the outdoor heat exchanger 130, and a fourth port 151d connected to an accumulator 110.

As described above, the outdoor heat exchanger 130 may operate as a condenser for condensing a high temperature and high pressure refrigerant gas to a high pressure refrigerant fluid at temperatures equal to or lower than a condensation temperature in the cooling mode, and as an evaporator for evaporating a low temperature and low pressure refrigerant fluid to a refrigerant gas in the heating mode.

An outdoor blower fan 181 may be installed near the outdoor heat exchanger 130 for increasing heat exchange efficiency between the refrigerant and outdoor air. When the blower fan 181 rotates to blow the outdoor air to the outdoor heat exchanger 130 during the cooling operation, a high temperature refrigerant flowing in the outdoor heat exchanger 130 is cooled down while the outdoor air is heated by heat emitted from the high temperature refrigerant. The heated air may be discharged to the outside by the outdoor blower fan 181.

A decompressor 251 may be installed between the outdoor heat exchanger 130 and the indoor heat exchanger 230. The decompressor 251 may be implemented with an electronic expansion valve capable of controlling an extent of an opening for reducing the pressure of the refrigerant, controlling the flow rate of the refrigerant, and blocking the flow of the refrigerant when required. Although in this example the decompressor 251 is shown as being provided in the indoor unit 200, the decompressor 251 may be provided in the outdoor unit 100 as mentioned above.

The accumulator 110 may be provided between the fourth port 151d of the flow path switching valve 151 and the compressor 120. The accumulator 110 may filter out a refrigerant that has not been changed in phase but remains in the liquid state among refrigerants flowing into the compressor 120 from the flow path switching valve 151, and supply oil to the compressor 120.

Furthermore, there may be an oil separator between the compressor 120 and the first port 151a of the flow path switching valve 151 for separating oil from the refrigerant discharged from the compressor 120.

The indoor unit 200 is a device for cooling or heating the room through heat exchange between a refrigerant and indoor air. The indoor unit 200 may include the indoor heat exchanger 230 and an indoor blower fan 281, and there may be two or more indoor heat exchangers and indoor blower fans installed in the indoor unit 200 as required.

The indoor heat exchanger 230 operates as an evaporator for evaporating a low temperature and low pressure refrigerant fluid to a refrigerant gas in the cooling mode, and operates as a condenser for condensing a high temperature and high pressure refrigerant gas to a high pressure refrigerant fluid at temperatures equal to or lower than a condensation temperature in the heating mode.

The indoor blower fan 281 may be installed near the indoor heat exchanger 230 for blowing indoor air to increase efficiency of heat exchange between the refrigerant circulating in the indoor heat exchanger 230 and the indoor air.

Figure 3:
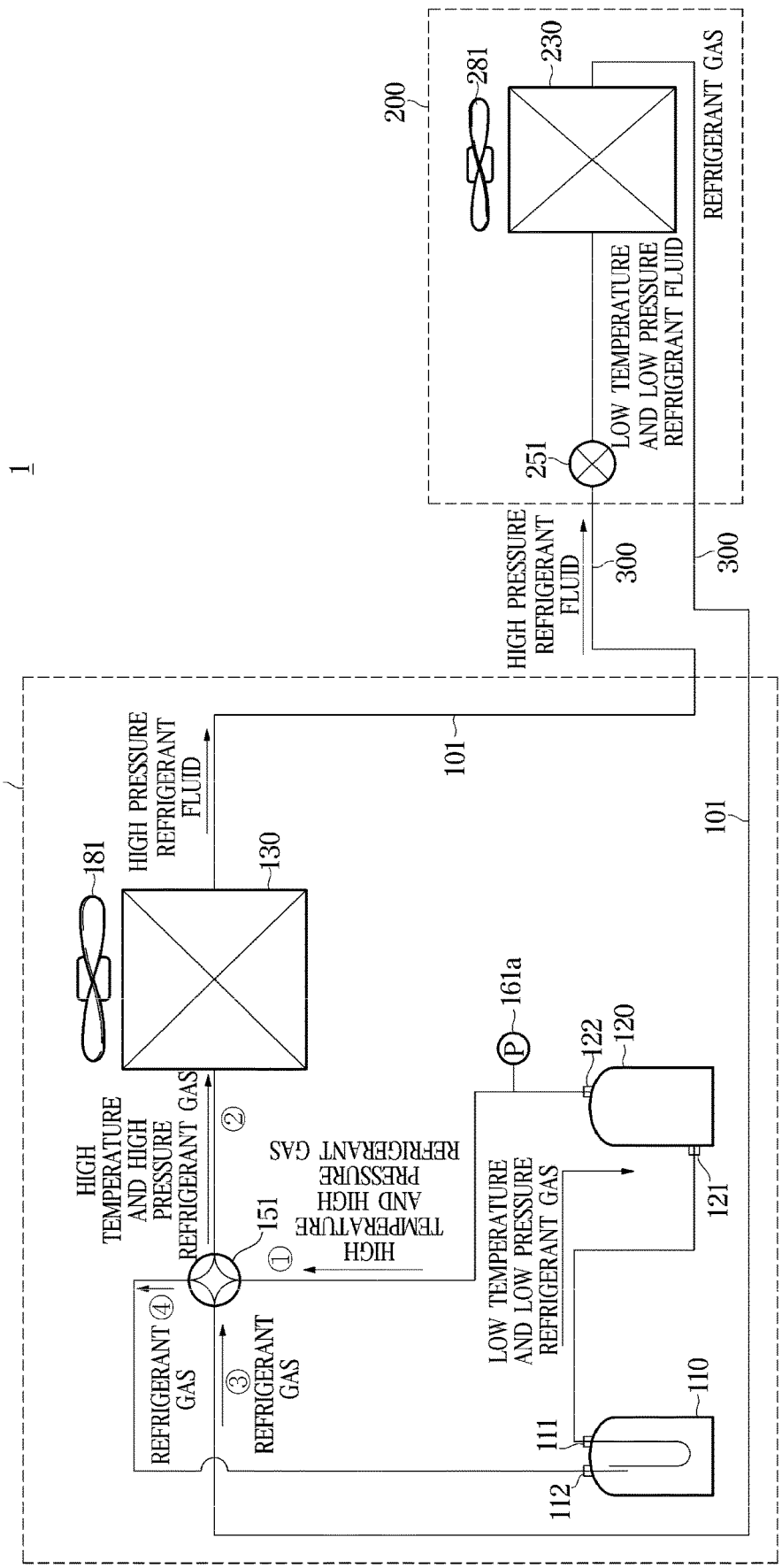
FIG. 3 shows flows of a refrigerant while an air conditioner performs cooling operation, according to an embodiment of the disclosure.

FIG. 3 shows flows of a refrigerant while an air conditioner performs cooling operation, according to an embodiment of the disclosure.

When the air conditioner 1 performs cooling operation, it may form a refrigerant flow path having the first port 151a linked to the third port 151c and the second port 151b linked to the fourth port 151d of the flow path switching valve 151.

Referring to FIG. 3, the high temperature and high pressure refrigerant gas discharged from the discharging port 122 of the compressor 120 flows into the first port 151a of the flow path switching valve 151(①), and is discharged through the third port 151c (②) to flow into the outdoor heat exchanger 130.

The outdoor heat exchanger 130 condenses a high temperature and high pressure refrigerant gas to a high pressure refrigerant fluid at temperatures equal to or lower than a condensation temperature through heat exchange between the refrigerant and outdoor air, and the high pressure refrigerant fluid discharged from the outdoor heat exchanger 130 is moved to the indoor unit 100 through the refrigerant pipe 300.

The outdoor fan 281 may bring outdoor air into the outdoor heat exchanger 130 to increase efficiency of heat exchange between the refrigerant flowing in the outdoor heat exchanger 130 and the outdoor air, and as the refrigerant gas is condensed to a refrigerant fluid in the outdoor heat exchanger 130, heated air may be discharged to the outside.

The high temperature refrigerant fluid moved to the indoor unit 100 is decompressed by the decompressor 251 and turned to a low temperature and low pressure refrigerant fluid.

The low temperature and low pressure refrigerant fluid flows into the indoor heat exchanger 230, which in turn evaporates the refrigerant fluid into a refrigerant gas through heat exchange between the refrigerant fluid flowing in and indoor air. In this case, the indoor fan 281 installed near the indoor heat exchanger 230 may be rotated to blow the indoor air into the indoor heat exchanger 230 and may release air that has been deprived of heat by the refrigerant and cooled down into the room.

The refrigerant gas discharged from the indoor heat exchanger 230 flows into the second port 151b of the flow path switching valve 151 (③), and the refrigerant gas then flows into an entrance 112 of the accumulator 110 through the fourth port 151d (④).

The accumulator 110 filters out a fluid contained in the refrigerant brought in, discharges the low temperature and low pressure refrigerant gas with oil through an outlet 111 and supplies them to the compressor 120.

The air conditioner 1 performs cooling operation through a circulation cycle in which the refrigerant supplied to the compressor 120 is compressed into high temperature and high pressure state and then discharged, and the discharged refrigerant is supplied back to the compressor 120 through the aforementioned procedure.

In the meantime, a high pressure refrigerant discharged from the compressor 120 and flowing in the refrigerant pipe 101, the outdoor heat exchanger 130, etc., needs to remain at pressure of a certain level or higher for various reasons. However, the higher the pressure of the refrigerant controlled, the higher the power consumption and the lower the operation efficiency for the outdoor unit. In an embodiment of the disclosure, the air conditioner 1 may reduce power consumption and improve operation efficiency by appropriately controlling high pressure of a refrigerant taking into account various operation conditions. Operation of the air conditioner 1 will now be described in detail.

Figure 4:
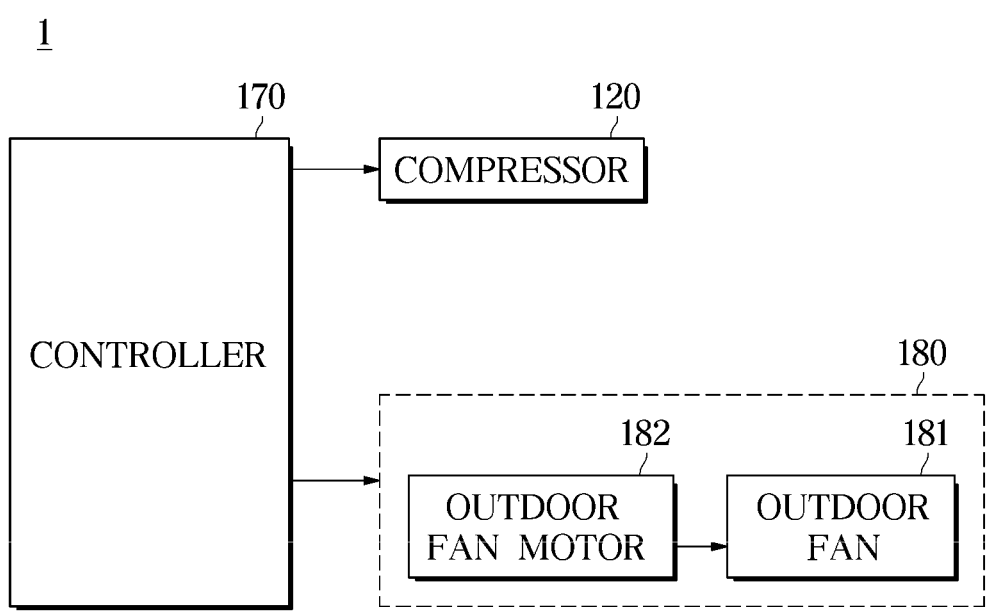
FIG. 4 is a control block diagram of an air conditioner, according to an embodiment of the disclosure.

FIG. 4 is a control block diagram of an air conditioner, according to an embodiment of the disclosure.

Referring to FIG. 4, in an embodiment of the disclosure, the air conditioner 1 may include the compressor 120 for compressing a refrigerant to discharge a high pressure refrigerant gas, the outdoor heat exchanger 130 for changing the high pressure refrigerant gas to a refrigerant fluid, the outdoor fan module 180 installed near the outdoor heat exchanger 130 for performing blowing, and a controller 170 for controlling pressure or temperature of the refrigerant based on operation conditions including two or more of a first condition determined based on an installation environment, a second condition determined based on an optimal compression ratio of the compressor 120, a third condition determined based on an outdoor temperature, and a fourth condition set as a default value.

Operations of the compressor 120 and the outdoor heat exchanger 130 are the same as what are described above in connection with FIGS. 2 and 3.

The outdoor fan module 180 includes an outdoor fan 181 for increasing efficiency of heat exchange between a refrigerant flowing in the outdoor heat exchanger 130 and outdoor air by blowing the outdoor air into the outdoor unit 100 and discharging air heated by absorbing heat from the refrigerant to the outside, and an outdoor fan motor 182 for providing rotational force to the outdoor fan 181.

The controller 170 for controlling pressure or temperature of a refrigerant based on operation conditions may include at least one memory for storing a program for carrying out operations, which will be described later, and at least one processor for executing the program. The controller 170 may also be arranged in the outdoor unit 100 to control general operation of the outdoor unit 100. The air conditioner 1 is not, however, limited thereto, and it is also possible that the controller 170 is implemented as an integrated controller for controlling the outdoor unit 100 and the indoor unit 200 in an integrated manner.

The operation conditions are related to operation environments of the air conditioner 1, which are conditions for minimum pressure or minimum temperature required in the operation environment such as an installation environment, reliability of the compressor, or outdoor temperature. The first condition may include first pressure or first temperature determined based on an installation environment, second pressure or second temperature determined based on an optimal compression ratio of the compressor 120, third pressure or third temperature determined based on an outdoor temperature, and fourth pressure or fourth temperature set as a default value. The fourth pressure or fourth temperature set as a default value may be arbitrarily set by the manufacturer or set by an installation engineer at the time of installing the air conditioner 1.

In this embodiment of the disclosure, operations are about those performed by the air conditioner 1 in the cooling mode. Hence, the pressure to be controlled may be pressure of the refrigerant, i.e., high pressure or condensation pressure of the refrigerant discharged from the compressor 120 and flowing in the refrigerant pipe 101 inside the outdoor unit 100, the outdoor heat exchanger 130, etc.

In this embodiment, the high pressure of the refrigerant refers to pressure of the refrigerant flowing in the outdoor unit 100 that performs cooling operation, specifically, the pressure of the refrigerant discharged from the compressor 120 and flowing in the refrigerant pipe 101, the outdoor heat exchanger 130, etc., before being decompressed by the decompressor.

Furthermore, the temperature to be controlled may be a temperature of the refrigerant, i.e., a condensation temperature of the refrigerant discharged from the compressor 120 and flowing in the refrigerant pipe 101 inside the outdoor unit 100, the outdoor heat exchanger 130, etc.

The components in the outdoor unit 100 are connected by the refrigerant pipe 101, so the pressure or temperature of the refrigerant at a spot may have an influence on the pressure or temperature of the refrigerant at the other spots. For example, when the pressure of the refrigerant at the outdoor heat exchanger 130 is controlled, the pressure of the refrigerant discharged from the compressor 120 may also be controlled; and when the temperature of the refrigerant at the outdoor heat exchanger 130 is controlled, the temperature of the refrigerant in the other parts may also be controlled.

Figure 5:
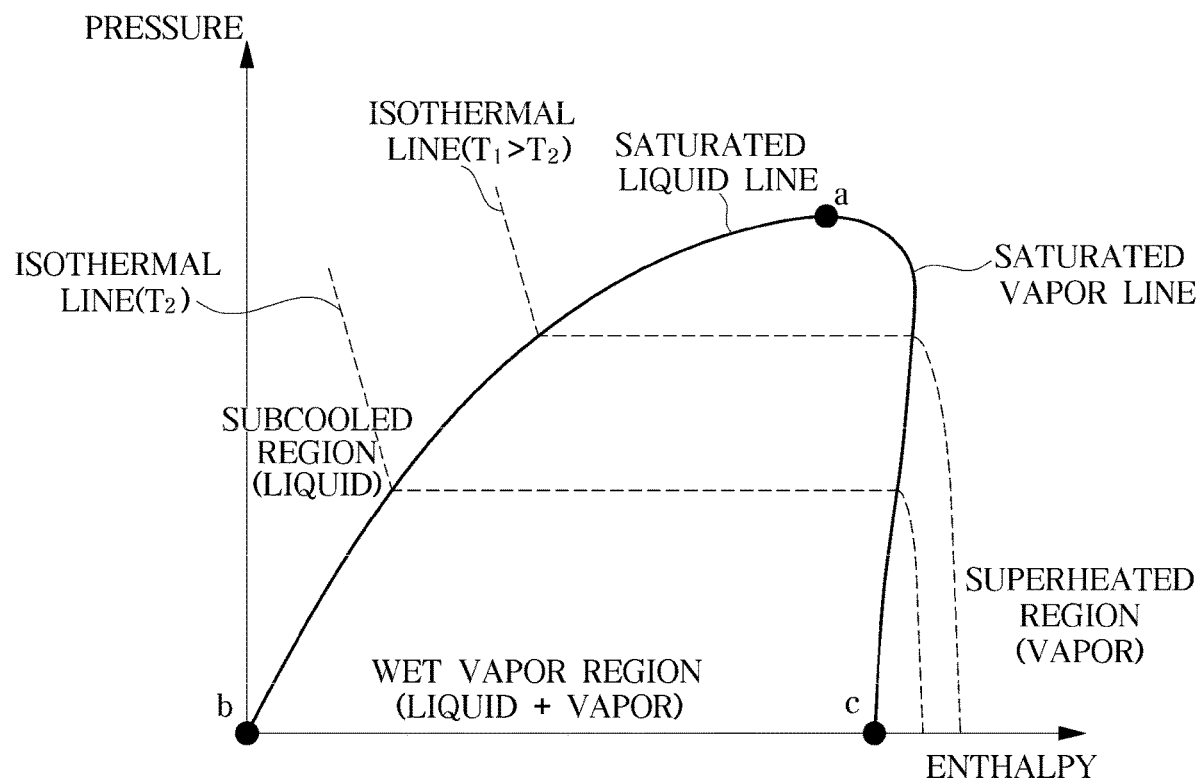
FIG. 5 is a PH diagram representing relations between enthalpy and pressure of a refrigerant.

FIG. 5 is a PH diagram representing relations between enthalpy and pressure of a refrigerant.

Referring to FIG. 5, in the PH diagram, the refrigerant in the cooling cycle may have a total of three states depending on changes in pressure. In FIG. 5, a superheated region on the right represents a state in which the entire refrigerant exists as vapor, and a wet vapor region in the middle represents a state in which the refrigerant is changing in phase from vapor to liquid, i.e., a state in which the refrigerant exists as a mixture of vapor and liquid. A sub-cooled region on the left represents a state in which the entire refrigerant exists in a liquid phase.

A saturated vapor line connecting a to c refers to a line to distinguish the state in which the refrigerant is a mixture of liquid and vapor from a state in which the refrigerant exists only as vapor. The refrigerant beginning to be condensed from vapor to liquid exists on the saturated vapor line.

In the superheated region on the right to the saturated vapor line exists only vapor, which indicates a superheated vapor state higher than a saturation temperature. In other words, the refrigerant in the vapor state existing in the right region to the saturated vapor line has a temperature higher than a liquid evaporating under the same pressure.

In the wet vapor region on the left to the saturated vapor line exists a mixture of refrigerant vapor and refrigerant liquid condensed from the vapor state or of refrigerant liquid and refrigerant vapor evaporated from the liquid state. Accordingly, the refrigerant in the outdoor heat exchanger 130 operating as a condenser in the cooling mode and the refrigerant in the indoor heat exchanger 230 operating as an evaporator in the cooling mode exist in the state of the wet vapor region. During the change from vapor to liquid, there is a certain relation between the condensation pressure and the temperature, so when pressure is determined, temperature is determined, and when the temperature is determined, pressure may be figured out.

A line connecting a to b represents a saturated liquid line that distinguishes a refrigerant liquid from a refrigerant in a mixed state of liquid and vapor. The refrigerant beginning to evaporate from liquid to vapor exists on the saturated liquid line.

The pressure and temperature at a critical point a where the saturated liquid line and the saturated vapor line meet are referred to as a critical pressure and a critical temperature, respectively. The critical temperature refers to the highest temperature at which the refrigerant may be condensed. Accordingly, the refrigerant is no longer condensed above the critical temperature.

Furthermore, referring to a isothermal line drawn on the PH diagram, it may be seen that pressure of the refrigerant on the isothermal line is almost the same in the wet vapor state in which both vapor and liquid exist. Moreover, it may be seen that when the temperature of the refrigerant goes down the pressure also goes down. In other words, when temperature of the refrigerant in the outdoor heat exchanger 130 is not changed, pressure is not changed either, and when the temperature goes down, the pressure also goes down.

Accordingly, when the outdoor fan 181 is rotated to bring in outdoor air, the refrigerant passing the outdoor heat exchanger is cooled down by the outdoor air, so the temperature goes down and the pressure goes down as well.

The controller 170 may control the outdoor fan 181 to control high pressure or temperature of the refrigerant flowing in the outdoor unit 100 and transmit a control signal to the outdoor fan motor 182 to control the outdoor fan 181. Accordingly, controlling pressure or temperature of the refrigerant in the following embodiment of the disclosure may include controlling the outdoor fan 181 or transmitting a control signal to the outdoor fan motor 182. For example, controlling the outdoor fan 181 may be performed by Proportional-Integral-Differential (PID) control or fuzzy control.

The controller 170 may set the highest value of operation conditions to be a target condition, and based on the set target condition, control pressure or temperature of the refrigerant. The operation condition may include a pressure condition and a temperature condition.

Specifically, the controller 170 may set the highest pressure of the pressure condition including two or more of first pressure determined based on an installation environment, second pressure determined based on an optimal compression ratio of the compressor 120, third pressure determined based on an outdoor temperature, and fourth pressure set as a default value to a target pressure, and control the pressure of the refrigerant based on the target pressure. The target pressure may include a target high pressure or a target condensation pressure, and the pressure of the refrigerant to be controlled may also include a high pressure or condensation pressure.

Furthermore, the controller 170 may set the highest temperature of the temperature condition including two or more of first temperature determined based on an installation environment, second temperature determined based on an optimal compression ratio of the compressor 120, third temperature determined based on an outdoor temperature, and fourth temperature set as a default value to a target condensation temperature, and control the temperature of the refrigerant based on the target condensation temperature.

The controller 170 may transmit a control signal to the outdoor fan motor 182 to control the number of revolutions of the outdoor fan 181 based on the set target condition. For example, when the current pressure of the refrigerant is higher than the target high pressure or the current temperature of the refrigerant is higher than the target condensation temperature, a control signal to increase the number of revolutions of the outdoor fan 181 may be transmitted to the outdoor fan motor 182.

Figure 6:
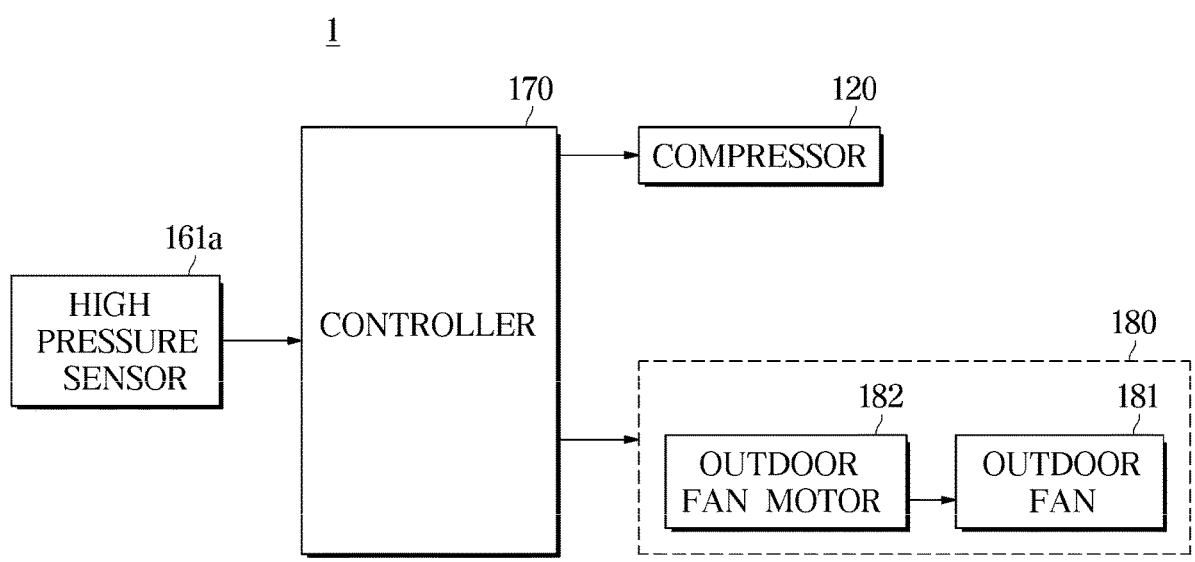
FIG. 6 is a control block diagram of an air conditioner including a pressure sensor.
Figure 7:
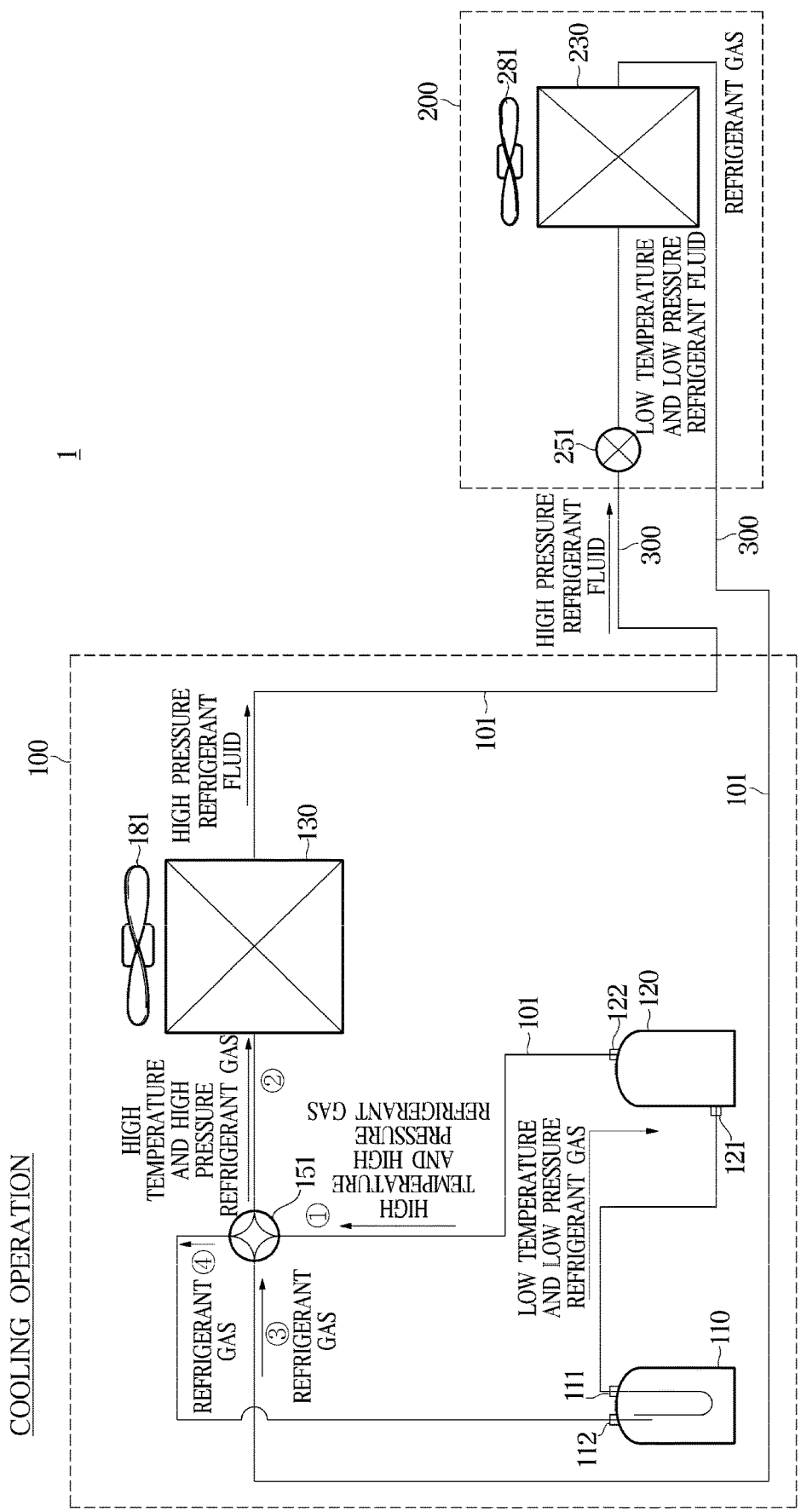
FIG. 7 shows configurations of an air conditioner including a pressure sensor.

FIG. 6 is a control block diagram of an air conditioner including a pressure sensor, and FIG. 7 shows configurations of an air conditioner including a pressure sensor.

Referring to FIG. 6, in an embodiment of the disclosure, the air conditioner 1 may further include a high pressure sensor 161*a* for measuring current high pressure of the refrigerant to obtain the current pressure of the refrigerant.

For example, the high pressure sensor 161*a* may be installed between the discharge port 122 of the compressor 120 and the outdoor heat exchanger 130 as shown in FIG. 7. Specifically, the high pressure sensor 161*a* may be installed near the discharge port 122 of the compressor 120 to measure pressure of the refrigerant discharged from the compressor 120.

The controller 170 may compare the current high pressure of the refrigerant measured by the high pressure sensor 161*a* with the target high pressure to control the outdoor fan 181. For example, when the pressure measured by the high pressure sensor 161*a* is higher than the target high pressure, the number of revolutions of the outdoor fan 181 may be increased. The high pressure sensor 161*a* may measure high pressure of the refrigerant in real time or periodically, and the controller 170 may also control the pressure of the refrigerant in real time or periodically.

Alternatively, the controller 170 may gradually control the number of revolutions of the outdoor fan 181. For example, when the number of revolutions of the outdoor fan 181 was increased at a previous point in time but the current pressure of the refrigerant is still higher than the target high pressure, the number of revolutions of the outdoor fan 181 may be gradually increased.

Alternatively, the controller 170 may control the number of revolutions of the outdoor fan 181 to be proportional to a difference between the measured current high pressure of the refrigerant and the target high pressure.

The aforementioned control methods are examples to be applicable to embodiments of the air conditioner 1, and there are no limitations on the control method performed by the controller 170 to make a high pressure of the refrigerant the target high temperature.

Figure 8:
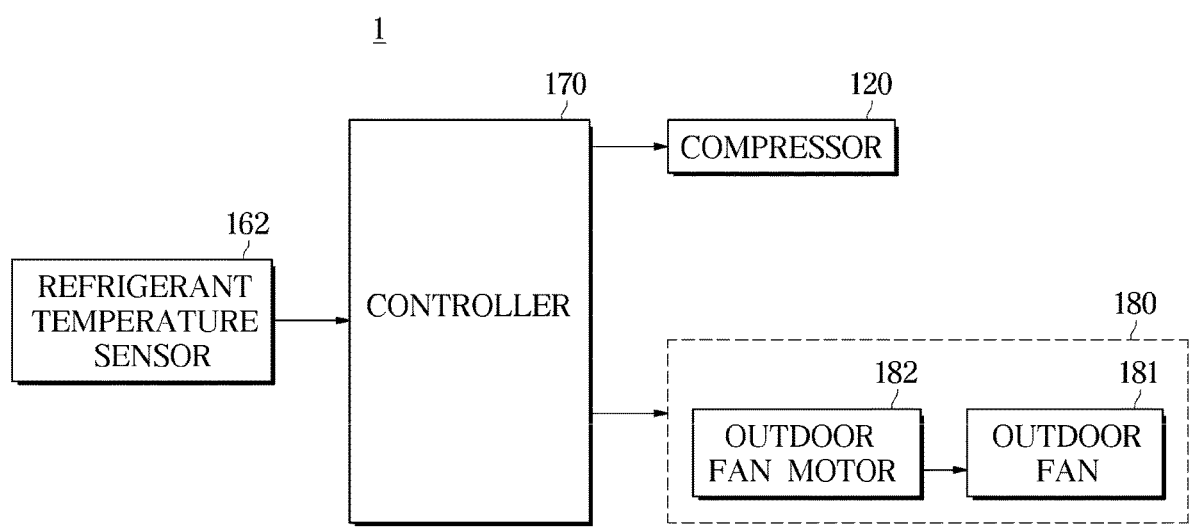
FIG. 8 is a control block diagram of an air conditioner including a temperature sensor.
Figure 9:
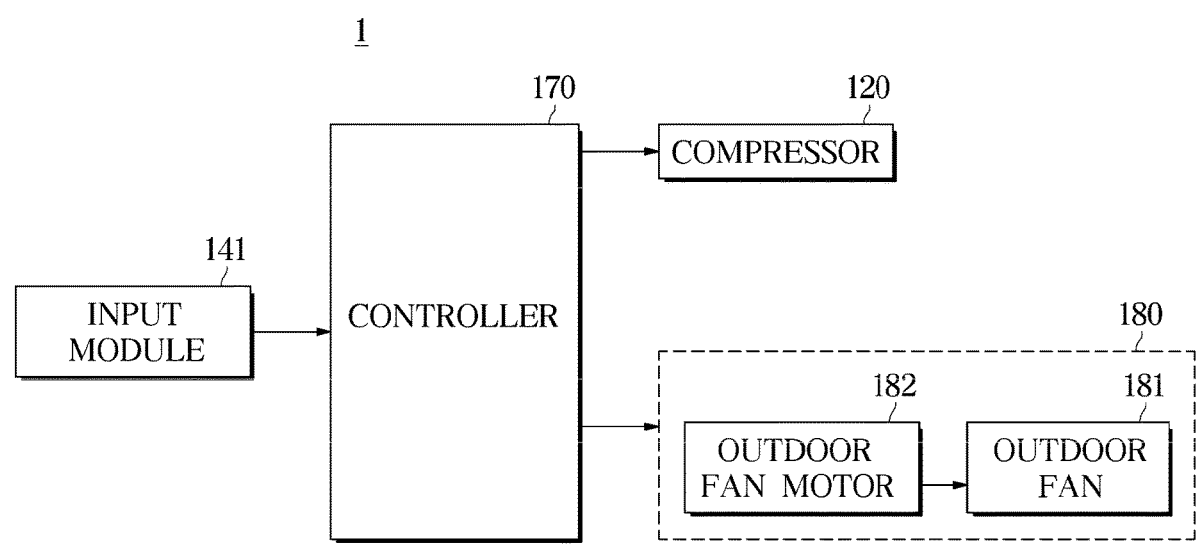
FIG. 9 is a control block diagram of an air conditioner including an input module.

FIG. 8 is a control block diagram of an air conditioner including a temperature sensor, and FIG. 9 is a control block diagram of an air conditioner including an input module.

Depending on the product configuration, the air conditioner may not be equipped with a sensor to measure pressure. In this case, as shown in FIG. 8, a refrigerant temperature sensor 162 may be included in the air conditioner 1 to measure temperature of the refrigerant. The refrigerant temperature sensor 162 may be equipped in the outdoor heat exchanger 130 to measure temperature of the refrigerant flowing in the outdoor heat exchanger 130.

The controller 170 may obtain pressure of the refrigerant based on the measured temperature of the refrigerant. As described above, while the refrigerant is changing from vapor to liquid, there is a certain relation between pressure and temperature of the refrigerant. The relation between temperature and pressure of the refrigerant may be stored in advance, and pressure of the refrigerant may be calculated using the relation stored and the measured temperature of the refrigerant. It is also possible to use a table matching a pressure to each temperature of the refrigerant. In this case, the controller 170 may compare the pressure of the refrigerant obtained with the target pressure to control the outdoor fan 181, as described above.

To control temperature of the refrigerant, the controller may control temperature of the refrigerant based on a temperature of the refrigerant measured by the refrigerant temperature sensor 162. Specifically, when the measured temperature of the refrigerant is higher than the target condensation temperature, the controller 170 may facilitate heat exchange between the refrigerant and outdoor air by increasing the number of revolutions of the outdoor fan 181. Controlling the outdoor fan 181 is the same as what is described above with respect to controlling the pressure of the refrigerant.

When the high pressure sensor 161*a* is provided, it is also possible for the high pressure sensor 161*a* to obtain the current temperature of the refrigerant from the measured pressure.

Operation of setting a target condition based on an operation condition of the air conditioner 1 according to an embodiment of the disclosure will now be described in detail.

The controller 170 may set the highest value of the operation condition to be the target condition. When the operation condition includes two or more of first, second, third, and fourth pressures, the highest one of them may be a target pressure, and when the operation condition includes two or more of first, second, third, and fourth temperatures, the highest one of them may be a target temperature.

As described above, a high pressure refrigerant discharged from the compressor 120 and flowing in the refrigerant pipe 101, the outdoor heat exchanger 130, etc., needs to remain at pressure of a certain level or higher for various reasons. Such a condition given for pressure of the refrigerant is called an operation condition. As described above, however, it is also possible to control condensation temperature of the refrigerant instead of the condensation pressure of the refrigerant because there is a certain relation between the condensation temperature and the condensation pressure of the refrigerant. Accordingly, the operation condition may include the pressure condition or the temperature condition.

The pressure condition may include two or more of first pressure determined based on an installation environment, second pressure determined based on an optimal compression ratio of the compressor 120, third pressure determined based on outdoor temperature, and fourth pressure set as a default value, and the temperature condition may include two or more of first temperature determined based on an installation environment, second temperature determined based on an optimal compression ratio of the compressor 120, third temperature determined based on outdoor temperature, and fourth temperature set as a default value.

The outdoor unit 100 and the indoor unit 200 are connected by the connection pipe 300, and the refrigerant compressed by the compressor 120 of the outdoor unit 100 is moved to the indoor unit 200 through the connection pipe 300. By the nature of the outdoor unit 100 located outdoors and the indoor unit 200 located indoors, pressure drop is inevitable during the migration of the refrigerant through the connection pipe 300. Accordingly, high pressure of the refrigerant at a certain level or higher needs to be secured.

The longer the length of the connection pipe 300, the larger the loss in pressure of the refrigerant. Hence, the high pressure of the refrigerant may be determined taking into account such a loss in pressure, and the first pressure is the pressure determined to compensate for the loss in pressure. However, as the high pressure of the refrigerant becomes higher, power consumption of the outdoor unit 1 increases, so minimum pressure that may compensate for the loss in pressure occurring when the refrigerant flows in the connection pipe 300 may be determined to be the first pressure.

The installation environment may include at least one of length of the connection pipe 300 or a difference in level between the outdoor unit 100 and the indoor unit 200, and the length of the connection pipe 300 may include vertical length and horizontal length.

For example, when the length of the connection pipe 300 and the difference in level are in a standard range, a fixed default value may be the first pressure, and when the length of the connection pipe 300 and the difference in level are out of the standard range, a value larger than the fixed default value entered by the user may be the first pressure.

As shown in FIG. 9, the air conditioner 1 may further include an input module 141 for receiving an input related to the first pressure from the user. The user input may include information about the installation environment or include a pressure value taking into account the installation environment.

When the user input includes information about the installation environment, the controller 170 may determine pressure corresponding to the installation environment and the pressure may be the first pressure.

The first temperature may be a condensation temperature corresponding to the first pressure, and when the controller controls the condensation temperature of the refrigerant, the operation condition may include the first temperature.

Figure 10:
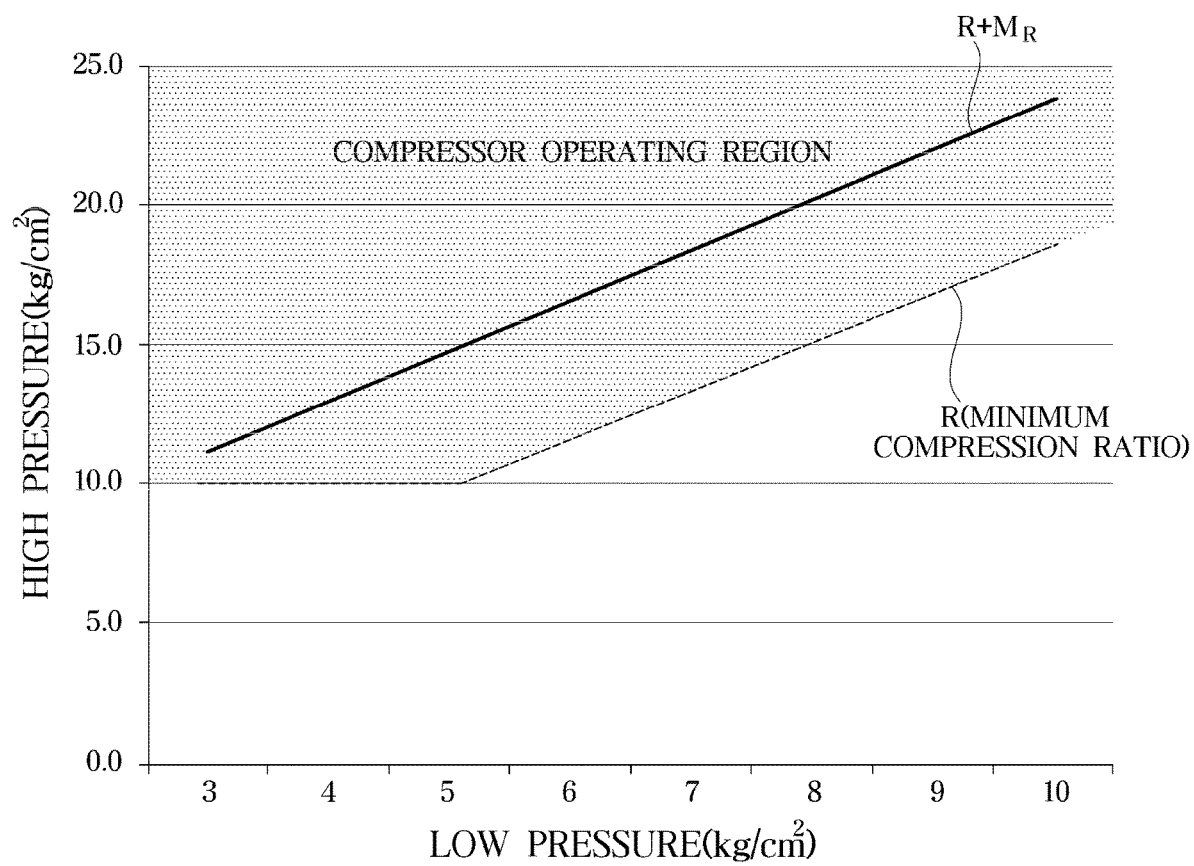
FIG. 10 is a graph representing an example of an operating region of a compressor.
Figure 11:
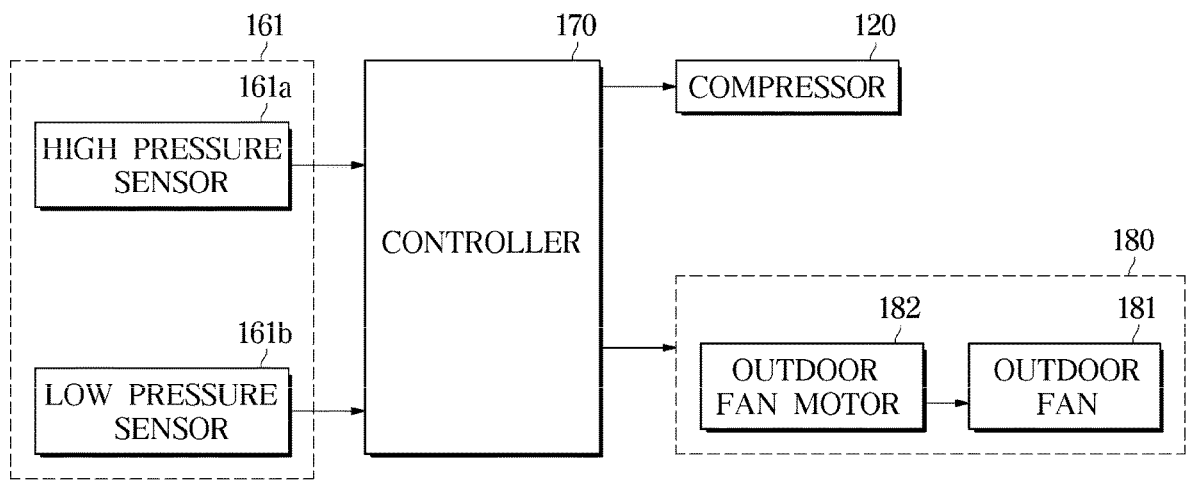
FIG. 11 is a control block diagram of an air conditioner including a low pressure sensor.
Figure 12:
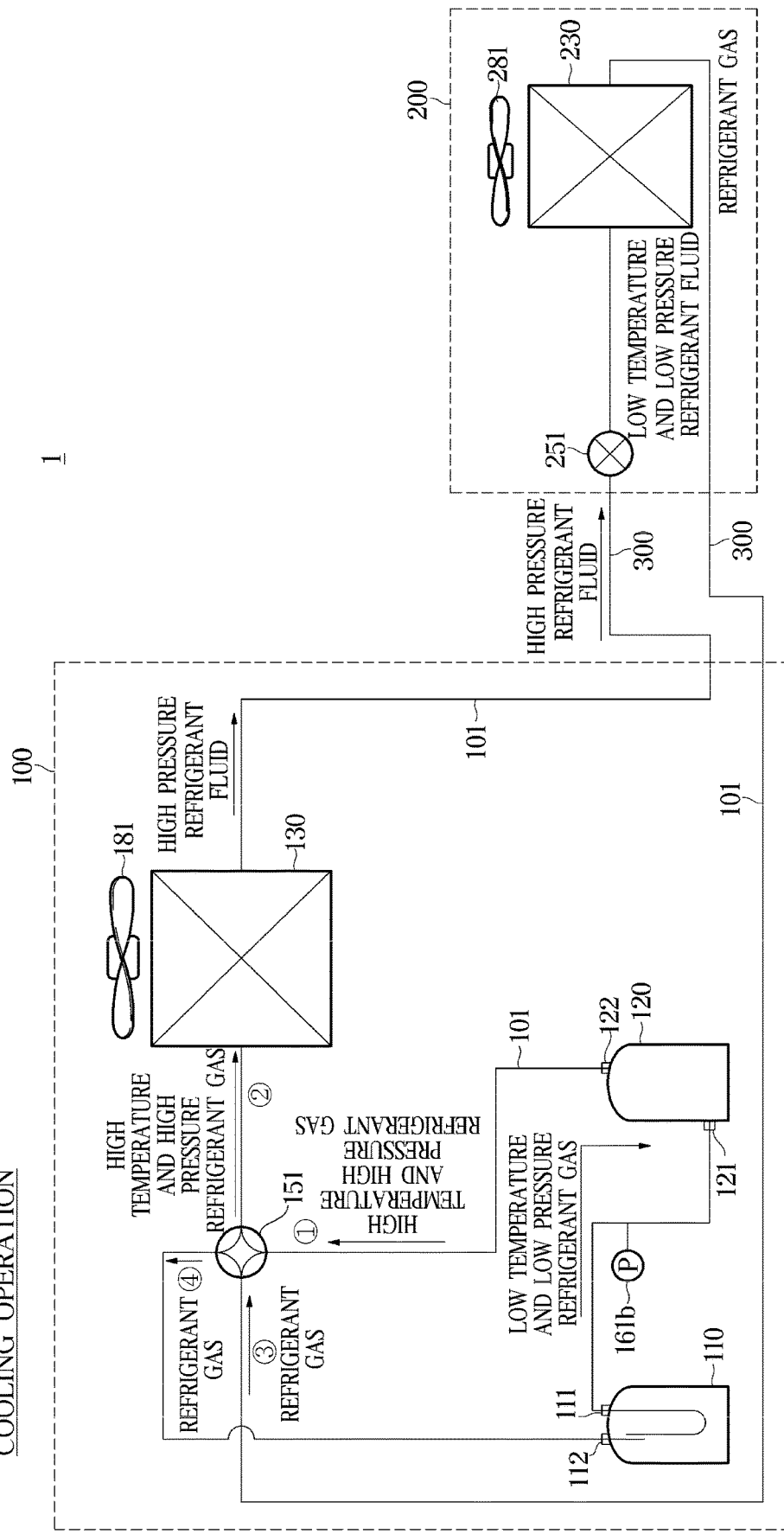
FIG. 12 shows a position of a low pressure sensor in an air conditioner.

FIG. 10 is a graph representing an example of an operating region of a compressor, FIG. 11 is a control block diagram of an air conditioner including a low pressure sensor, and FIG. 12 shows a position of a low pressure sensor in an air conditioner.

The operating region may be determined for each compressor, and the operating region may be defined by a minimum compression ratio. A compression ratio indicates a ratio of high pressure to low pressure (sucking pressure) of the refrigerant, and reliability of the compressor may be secured when the ratio of high pressure to low pressure of the refrigerant is equal to or higher than the minimum compression ratio. That is, the compression ratio equal to or greater than the minimum compression ratio becomes the optimal compression ratio.

For example, as shown in FIG. 10, when the minimum compression ratio of the compressor 120 is set to R, a region above a straight line indicating the minimum compression ratio R is the operating region of the compressor. That is, high pressure of the refrigerant needs to be equal to or larger than (lower pressure of the refrigerant*R).

Referring to FIGS. 11 to 12, the pressure sensor 161 of the air conditioner 1 may further include a low pressure sensor 161b for measuring low pressure of the refrigerant. The low pressure sensor 161b may be installed between the compressor 120 and the accumulator 110, specifically near the sucking port 121 of the compressor 120 for measuring pressure of the refrigerant before the refrigerant is compressed by the compressor 120, i.e., low pressure, in real time or periodically.

Alternatively, the low pressure sensor 161b may not be provided in the air conditioner 1. In this case, a refrigerant temperature sensor may be provided in the indoor heat exchanger 130, and a temperature of the refrigerant measured by the refrigerant temperature sensor in the indoor heat exchanger 130 may be an evaporation temperature of the refrigerant. The controller 170 may calculate evaporation pressure of the refrigerant from the temperature of the refrigerant measured by the indoor heat exchanger 130 and use the evaporation pressure of the refrigerant as the low pressure of the refrigerant.

The controller 170 may determine a minimum high pressure that may secure reliability of the compressor 120 based on the measured low pressure of the refrigerant and the minimum compression ratio of the compressor 120, and determine the second pressure based on the minimum high pressure. For example, the second pressure $P_2$ may be determined as in the following equation 1 by adding a compensation coefficient $P_M$ for enhancement of reliability to the minimum high pressure $P_{MH}$ obtained by multiplying the low pressure $P_L$ of the refrigerant by the minimum compression ratio R.

$$P_2 = P_L * R + P_M \quad (1)$$

Alternatively, as expressed in the following equation 2, the second pressure $P_2$ may be determined by multiplying a value obtained by adding the compensation coefficient $P_M$ for enhancement of reliability to the minimum compression ratio R with the low pressure $P_L$ of the refrigerant.

$$P_2 = P_L * (R + R_M) \quad (2)$$

There is a fixed minimum high pressure defined for each compressor independently of low pressure of the refrigerant. For example, as for a particular refrigerant, as shown in the graph of FIG. 10, 10 kg/cm$^2$ may be set to be the fixed minimum high temperature for securing reliability of the compressor. Accordingly, the controller 170 may determine the second pressure to be the fixed minimum high pressure when the pressure determined according to equation 1 or 2 is smaller than the fixed minimum high temperature.

On the other hand, when the controller 170 controls temperature of the refrigerant, the second condition may include the second temperature and the controller 170 may calculate the second temperature from the second pressure based on the relation between pressure and temperature of the refrigerant.

Alternatively, it is also possible to calculate the second temperature based on a ratio between an evaporation temperature of the refrigerant measured by a refrigerant temperature sensor equipped in the indoor heat exchanger 230 and a condensation temperature of the refrigerant measured by a refrigerant temperature sensor equipped in the outdoor heat exchanger 130.

Figure 13:
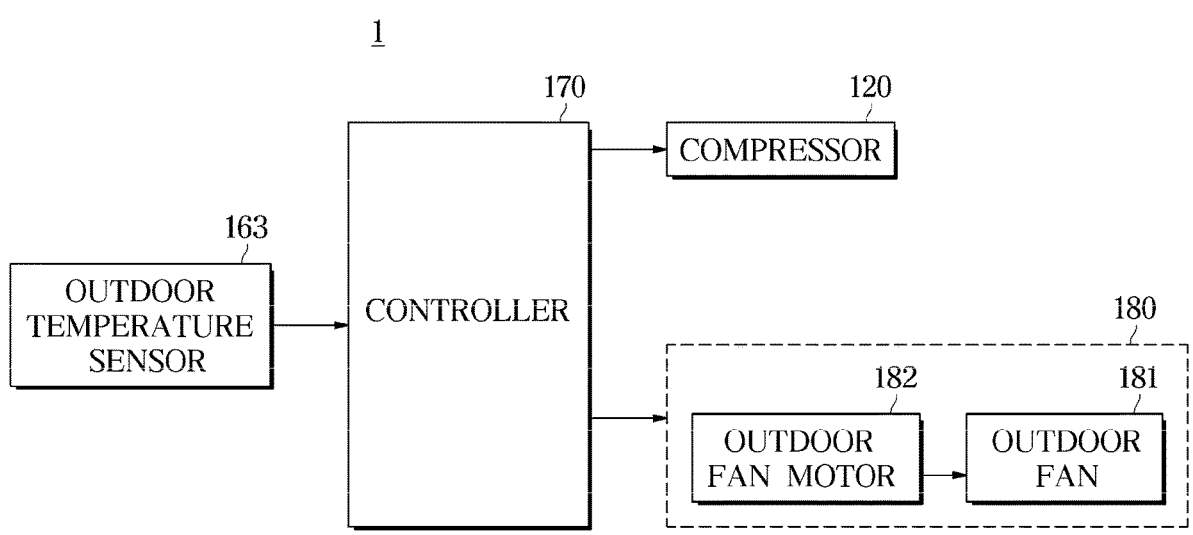
FIG. 13 is a control block diagram of an air conditioner including an outdoor temperature sensor.
Figure 14:
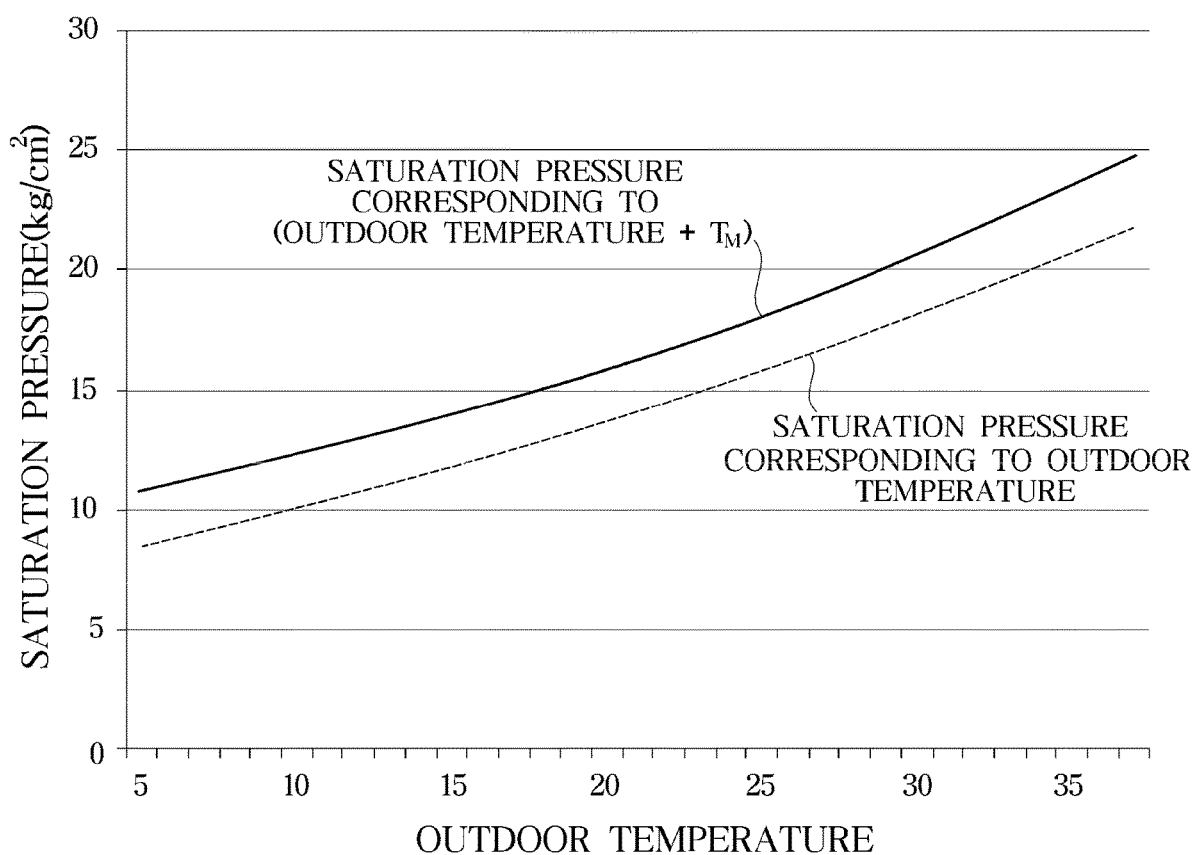
FIG. 14 is a graph representing relations between saturation pressure at outdoor temperature and third pressure.

FIG. 13 is a control block diagram of an air conditioner including an outdoor temperature sensor, and FIG. 14 is a graph representing relations between saturation pressure of outdoor temperatures and third pressure.

As described above, the outdoor fan 181 may facilitate heat exchange between the refrigerant and outdoor air by blowing outdoor air into the outdoor heat exchanger 130. The refrigerant of high temperature passing the outdoor heat exchanger 130 delivers heat to the outdoor air and decreases in temperature, but it is not physically possible that the temperature of the refrigerant drops lower than the temperature of the outdoor air. In other words, it is not possible that pressure of the refrigerant drops lower than the saturation pressure corresponding to the outdoor temperature. When the target high pressure is set to be less than the saturation pressure corresponding to the current outdoor temperature, the number of revolutions of the outdoor fan 181 rises inefficiently, causing increases in power consumption and decreases in efficiency. Accordingly, the saturation pressure corresponding to the current outdoor temperature may be the minimum pressure that the high pressure of the refrigerant may reach, and the third pressure may be determined based on the minimum pressure.

As shown in FIG. 13, the air conditioner 1 may further include an outdoor temperature sensor 163 for measuring outdoor temperature, and the controller 170 may determine the third pressure based on the outdoor temperature measured by the outdoor temperature sensor 163.

For example, as shown in FIG. 14, the third pressure may be determined to be the saturation pressure corresponding to a temperature obtained by adding a compensation coefficient $T_M$ to the outdoor temperature.

Alternatively, the third pressure may be determined to be a pressure obtained by adding a compensation coefficient $P_{M2}$ to the saturation pressure.

When the controller 170 controls temperature of the refrigerant, the third condition may include the third temperature and the controller 170 may determine the third temperature to be the outdoor temperature or a temperature obtained by adding a compensation coefficient to the outdoor temperature.

The fourth condition may be set as a default value for the product, and may also include fourth pressure or fourth temperature.

When the controller 170 controls pressure of the refrigerant, it may set a highest value of the pressure condition including two or more of the first, second, third, and fourth pressures to be the target pressure. Alternatively, it is also possible that the pressure condition includes another pressure in addition to the first to fourth pressures.

On the other hand, when the controller 170 controls temperature of the refrigerant, it may set the highest value of the temperature condition including two or more of the first, second, third, and fourth temperatures to be the target temperature. It is also possible that the temperature condition includes another temperature in addition to the first to fourth temperatures.

In an embodiment of the disclosure, the air conditioner 1 may satisfy various conditions depending on the operation environment of the air conditioner 1 by setting the highest value of the operation condition to be the target condition, and reduce power consumption and increase operation efficiency by determining the operation condition to have a value as small as possible.

Figure 15:
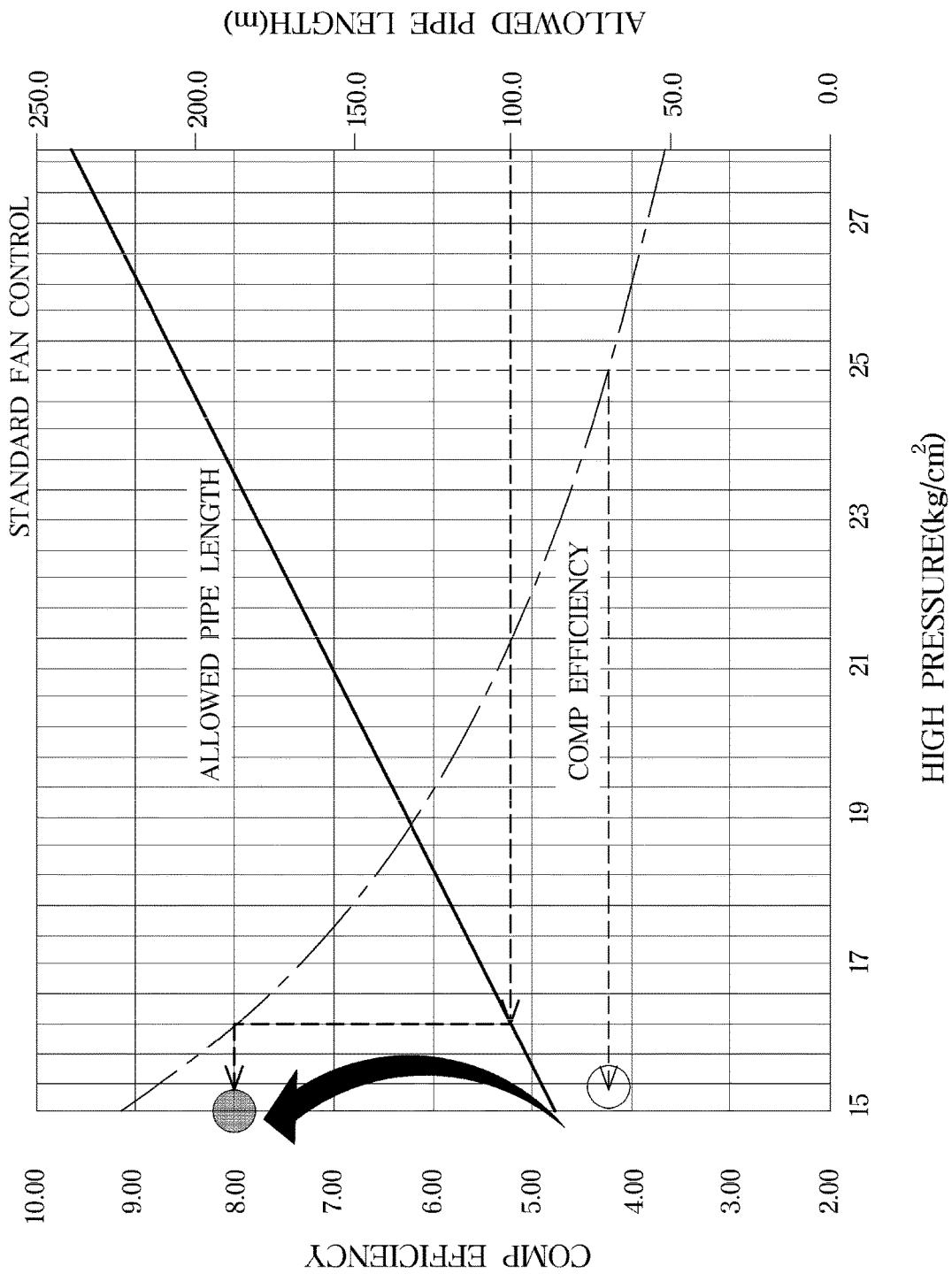
FIG. 15 is a graph representing changes in efficiency of a compressor of an air conditioner, according to an embodiment of the disclosure.

FIG. 15 is a graph representing changes in efficiency of a compressor of an air conditioner, according to an embodiment of the disclosure.

Referring to the graph of FIG. 15, when the pipe has the length of 100 m or less, the first pressure based on the installation environment may be determined to be about 16 kg/cm². When the second pressure for securing reliability of the compressor, the third pressure based on the outdoor temperature, or the fourth pressure set as a default value is not larger than the first pressure, the first pressure may be set to be the target high pressure.

It may be seen that when the target high pressure is changed from the old fixed value, i.e., 25 kg/cm² to a value determined according to the aforementioned embodiment, i.e., 16.2 kg/cm², the compressor efficiency almost doubles up.

In other words, in an embodiment of the disclosure, the air conditioner 1 may set the target high pressure among possible high pressures determined as low as possible taking into account various operation conditions, thereby preventing increases in power consumption and decreases in operation efficiency due to controlling the high pressure of the refrigerant to be unnecessarily high.

A control method of an air conditioner according to an embodiment of the disclosure will now be described. The air conditioner 1 according to the previous embodiment of the disclosure will be used to perform the control method of an air conditioner. What are described above with reference to FIGS. 1 to 15 may also be applied in the control method of the air conditioner even without being specifically mentioned.

Figure 16:
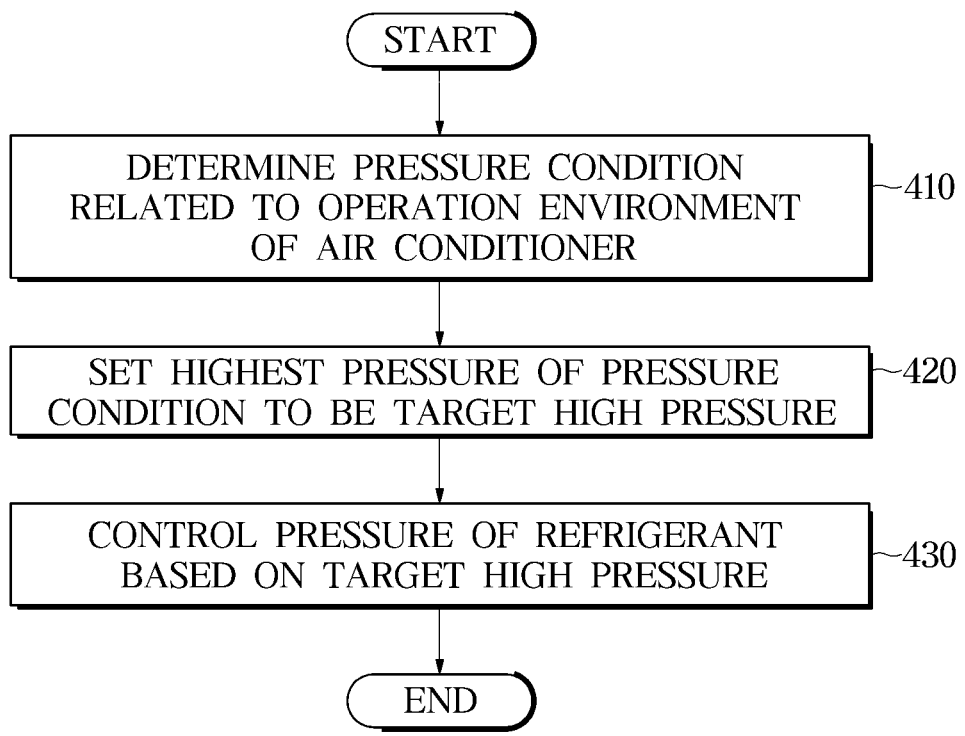
FIG. 16 is a flowchart of a control method of an air conditioner, according to an embodiment of the disclosure.

FIG. 16 is a flowchart of a control method of an air conditioner, according to an embodiment of the disclosure.

Referring to FIG. 16, a control method of an air conditioner may include determining a pressure condition related to an operation environment of the air conditioner in 410, setting a highest pressure of the determined pressure condition to be a target high pressure in 420, and controlling pressure of the refrigerant based on the set target high pressure in 430.

The pressure condition related to the operation environment is a high pressure condition of the refrigerant depending on the operation environment, and may include two or more of first pressure determined based on an installation environment, second pressure determined based on an optimal compression ratio of the compressor 120, third pressure determined based on outdoor temperature, and fourth pressure set as a default value.

The first pressure may be determined according to an installation environment including at least one of length of the connection pipe 30 connecting the outdoor unit 100 and the indoor unit 200 and a difference in level of the outdoor unit 100 and the indoor unit 200. For example, when the length of the connection pipe 300 and the difference in level are in a standard range, a fixed default value may be the first pressure, and when the length of the connection pipe 300 and the difference in level are out of the standard range, a value larger than the fixed default value entered by the user may be the first pressure.

The user input may include information about the installation environment or include a pressure value taking into account the installation environment. When the user input includes information about the installation environment, the controller 170 may determine pressure corresponding to the installation environment and the pressure may be the first pressure.

A procedure for determining the second and third pressures will be described later.

Although an occasion when the operation condition includes a pressure condition is taken as an example in this flowchart, the operation condition may include a temperature condition as well, as described above in the embodiment of the air conditioner 1. In this case, the control method of the air conditioner may include determining a temperature condition including two or more of first to fourth temperatures, setting a highest temperature of the determined temperature condition to be a target temperature, and controlling temperature of the refrigerant based on the set target temperature. The temperature of the refrigerant may include a condensation temperature.

Figure 17:
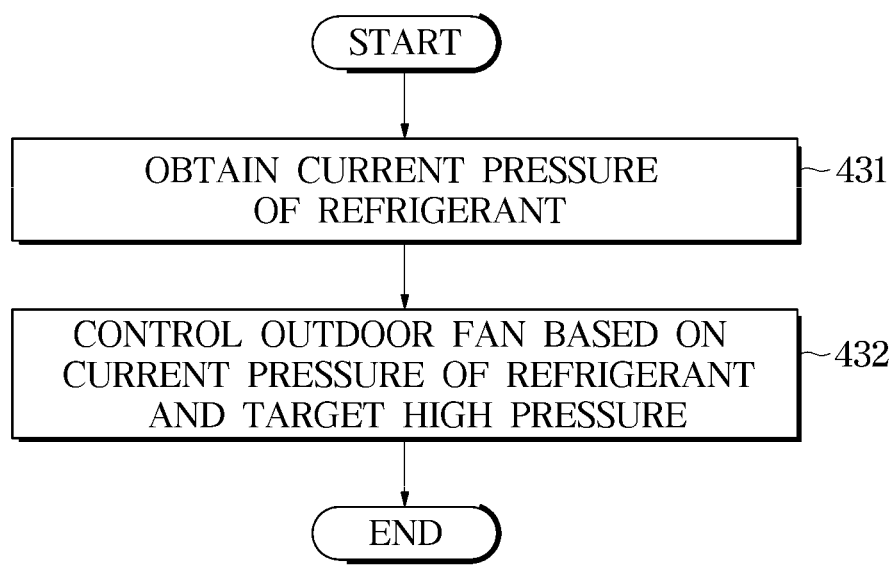
FIG. 17 is a detailed flowchart of a process of controlling pressure of a refrigerant in a control method of an air conditioner, according to an embodiment of the disclosure.

FIG. 17 is a detailed flowchart of a process of controlling pressure of a refrigerant in a control method of an air conditioner, according to an embodiment of the disclosure.

Referring to FIG. 17, controlling pressure of the refrigerant based on a set high pressure may include obtaining current pressure of the refrigerant in 431, and controlling the outdoor fan based on the current pressure and the target high pressure 432.

The current pressure of the refrigerant may be measured by the high pressure sensor 161a provided between the compressor 120 and the outdoor heat exchanger 130.

When the high pressure sensor 161a is not provided in the air conditioner 1, pressure of the refrigerant may be obtained based on the temperature of the refrigerant measured by the refrigerant temperature sensor 162 provided in the outdoor heat exchanger 130. For example, the controller 170 may store relations between temperature and pressure of the refrigerant in advance, and calculate pressure of the refrigerant using the relations stored and the measured temperature of the refrigerant. It is also possible to use a table matching a pressure to each temperature of the refrigerant.

The controller 170 may compare the current high pressure of the refrigerant measured by the high pressure sensor 161a with the target high pressure to control the outdoor fan 181. For example, when the pressure measured by the high pressure sensor 161a is higher than the target high pressure, the number of revolutions of the outdoor fan 181 may be increased. The high pressure sensor 161a may measure high pressure of the refrigerant in real time or periodically, and the controller 170 may also control the pressure of the refrigerant in real time or periodically.

Alternatively, the controller 170 may gradually control the number of revolutions of the outdoor fan 181. For example, when the number of revolutions of the outdoor fan 181 was increased at a previous point in time but the current pressure of the refrigerant is still higher than the target high pressure, the number of revolutions of the outdoor fan 181 may be gradually increased.

Alternatively, the controller 170 may control the number of revolutions of the outdoor fan 181 to be proportional to a difference between the measured current high pressure of the refrigerant and the target high pressure.

Although a case of controlling pressure of the refrigerant is taken as an example in this flowchart, temperature of the refrigerant may be controlled as well. In this case, the outdoor fan 181 may be controlled by comparing a temperature of the refrigerant measured by the refrigerant temperature sensor 162 provided in the outdoor heat exchanger 130 with a target temperature. For example, when the measured temperature of the refrigerant is higher than the target temperature, the number of revolutions of the outdoor fan 181 may be increased as described above. This was described above in detail in the embodiment of the air conditioner 1.

Figure 18:
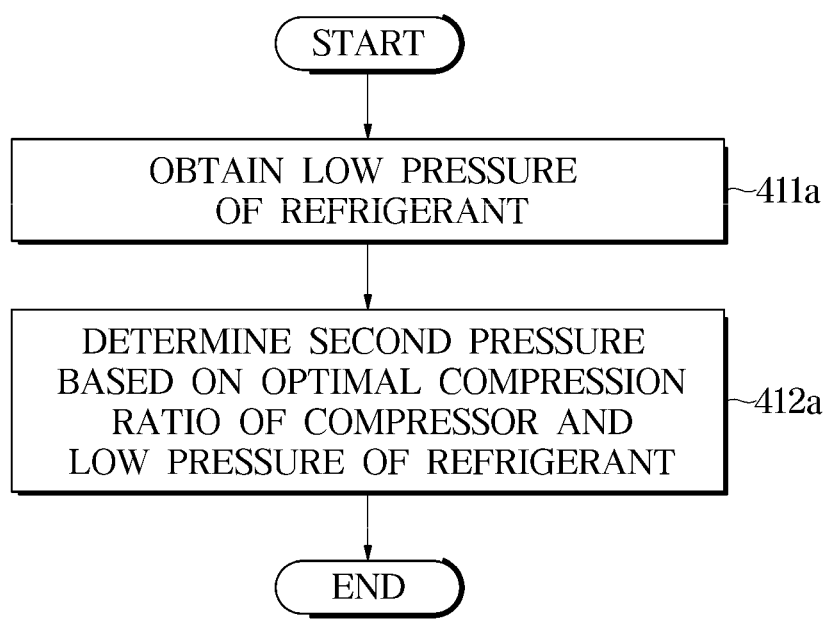
FIG. 18 is a detailed flowchart of a process of determining second pressure related to an operation environment of an air conditioner in a control method of the air conditioner, according to an embodiment of the disclosure.

FIG. 18 is a detailed flowchart of a process of determining second pressure related to an operation environment of an air conditioner in a control method of the air conditioner, according to an embodiment of the disclosure.

Referring to FIG. 18, determining a pressure condition related to an operation environment of the air conditioner may include obtaining low pressure of a refrigerant in 411a, and determining second pressure based on an optimal compression ratio of a compressor and the low pressure of the refrigerant in 412a.

For example, the low pressure of the refrigerant may be measured by the low pressure sensor 161b provided between the compressor 120 and the accumulator 110. Alternatively, as described above in connection with the embodiment of the air conditioner 1, based on a refrigerant temperature measured by a refrigerant temperature sensor provided in the indoor heat exchanger 130, the low pressure of the refrigerant may be calculated.

The controller 170 may determine a minimum high pressure that may secure reliability of the compressor 120 based on the measured low pressure of the refrigerant and the minimum compression ratio of the compressor 120, and determine the second pressure based on the minimum high pressure. For example, the second pressure $P_2$ may be determined as in the equation 1 by adding the compensation coefficient $P_M$ for enhancement of reliability to the minimum high pressure $P_{MH}$ obtained by multiplying the low pressure $P_L$ of the refrigerant by the minimum compression ratio R.

Alternatively, as expressed in the equation 2, the second pressure $P_2$ may be determined by multiplying a value obtained by adding the compensation coefficient $P_M$ for enhancement of reliability to the minimum compression ratio R with the low pressure $P_L$ of the refrigerant.

There is a fixed minimum high pressure defined for each compressor independently of low pressure of the refrigerant. The controller 170 may determine the second pressure to be the fixed minimum high pressure when the pressure determined according to equation 1 or 2 is smaller than the fixed minimum high temperature.

Although a case of determining the second pressure is taken as an example in this flowchart, it is possible to determine the second temperature for controlling temperature of the refrigerant. A condensation temperature corresponding to the second pressure may be determined to be the second pressure, and the second pressure may be determined using a ratio between an evaporation temperature measured by the refrigerant temperature sensor and the condensation temperature. This was described above in detail in the embodiment of the air conditioner 1. FIG. 19 is a detailed flowchart of a process of determining third pressure related to an operating environment of an air conditioner in a control method of the air conditioner, according to an embodiment of the disclosure.

Referring to FIG. 19, determining a pressure condition related to an operation environment of an air conditioner may include obtaining outdoor temperature in 411b, and determining third pressure based on saturation pressure corresponding to the outdoor temperature in 412b.

The outdoor temperature may be measured by the outdoor temperature sensor 163.

As described above, it is not possible that pressure of the refrigerant drops lower than the saturation pressure corresponding to the outdoor temperature. When the target high pressure is set to be less than the saturation pressure corresponding to the current outdoor temperature, there is an abnormal rise in the number of revolutions of the outdoor fan 181, causing increases in power consumption and decreases in efficiency.

The controller 170 may determine the third pressure to be the saturation pressure corresponding to a temperature obtained by adding a compensation coefficient $T_M$ to the outdoor temperature.

Alternatively, the third pressure may be determined to be a pressure obtained by adding a compensation coefficient $P_{M2}$ to the saturation pressure.

Although a case of determining the third pressure is shown in this flowchart, it is possible to determine third temperature as an operation condition in a case of controlling the temperature of the refrigerant. In this case, the outdoor temperature or a temperature obtained by adding the compensation coefficient to the outdoor temperature may be determined to be the third temperature.

According to a control method of an air conditioner in an embodiment of the disclosure, various conditions depending on operation environments of the air conditioner may be satisfied by setting a highest value of the operation conditions including two or more of first to fourth conditions to be a target condition, and reduce power consumption and increase operation efficiency by determining pressure conditions to have a value as small as possible.

According to the disclosure, an air conditioner and control method thereof may reduce power consumption and improve operation efficiency by appropriately controlling pressure or temperature of a refrigerant taking into account various operation conditions.

The above description illustrates the disclosure. Embodiments of the disclosure are described above, and the disclosure may be used in other various combinations and alterations of the embodiments, and environments. The disclosure may be changed or modified within a range equivalent to what is described above and/or a range of technologies or knowledge of ordinary skill in the art. The aforementioned embodiments of the disclosure are for explaining the best modes to practice the technical idea of the disclosure, and many different modifications thereto may be made for a specific application area and usage. Accordingly, the embodiments of the disclosure are not intended to limit the scope of the disclosure to what are disclosed above. The appended claims are to be interpreted as including other embodiments.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. An air conditioner comprising:
    a compressor configured to compress refrigerant and to thereby discharge high pressure refrigerant gas;
    an outdoor heat exchanger in which the high pressure refrigerant gas is changed to refrigerant fluid;
    an outdoor fan configured to blow outdoor air to the outdoor heat exchanger;
    a decompressor configured to decompress the refrigerant fluid into a low pressure state;
    an indoor heat exchanger in which the refrigerant in the low pressure state is changed to refrigerant gas; and
    a controller configured to control a pressure of the refrigerant or a temperature of the refrigerant based on operation conditions including:
        a first condition that is based on an installation environment of the air conditioner,
        a second condition that is based on an optimal compression ratio of the compressor,
        a third condition that is based on an outdoor temperature, and
        a fourth condition that is based on a default temperature of the refrigerant or a default pressure of the refrigerant,
        wherein the first condition that is determined based on the installation environment of the air conditioner includes at least one of a length of a connection pipe connecting an indoor unit to an outdoor unit or a difference in pressure level between the outdoor unit and the indoor unit.

2. The air conditioner of claim 1, wherein
    the first condition includes a first pressure of the refrigerant or a first temperature of the refrigerant determined based on the installation environment of the air conditioner,
    the second condition includes a second pressure of the refrigerant or a second temperature of the refrigerant determined based on the optimal compression ratio of the compressor, and
    the third condition includes a third pressure of the refrigerant or a third temperature of the refrigerant determined based on the outdoor temperature.

3. The air conditioner of claim 2, wherein the controller is configured to
    set a target pressure of the refrigerant or a target temperature of the refrigerant and, based on the target pressure of the refrigerant or the target temperature of the refrigerant, control a high pressure of the refrigerant or a condensation temperature of the refrigerant.

4. The air conditioner of claim 1, wherein the controller is configured to control the outdoor fan to control the pressure of the refrigerant or the temperature of the refrigerant.

5. The air conditioner of claim 4, further comprising:
    an outdoor fan motor configured to provide a rotational force to the outdoor fan,
    wherein the controller is configured to transmit a control signal to the outdoor fan motor to control the number of revolutions of the outdoor fan based on the operation condition.

6. The air conditioner of claim 5, wherein the controller is configured to transmit a control signal to the outdoor fan motor to increase the number of revolutions of the outdoor fan while a current pressure of the refrigerant or the temperature of the refrigerant is higher than a highest value of the operation condition.

7. The air conditioner of claim 6, further comprising:
    a high pressure sensor measuring the current pressure of the refrigerant,
    wherein the controller is configured to transmit a control signal to the outdoor fan motor to increase the number of revolutions of the outdoor fan while the pressure of the refrigerant measured by the high pressure sensor is higher than the highest value of the operation condition.

8. The air conditioner of claim 6, further comprising:
    a refrigerant temperature sensor measuring temperature of the refrigerant passing the outdoor heat exchanger, wherein the controller is configured to obtain the current pressure of the refrigerant based on the temperature of the refrigerant measured by the refrigerant temperature sensor.

9. The air conditioner of claim 6, further comprising:
a refrigerant temperature sensor measuring temperature of the refrigerant passing the outdoor heat exchanger,
wherein the controller is configured to transmit a control signal to the outdoor fan motor to increase the number of revolutions of the outdoor fan while the temperature of the refrigerant measured by the refrigerant temperature sensor is higher than the highest value of the operation condition.

10. The air conditioner of claim 1, wherein the second condition that is based on the optimal compression ratio of the compressor is determined based on a minimum compression ratio defining an optimal compression ratio of the compressor and a low pressure value of the refrigerant.

11. The air conditioner of claim 10, wherein the second condition that is based on the optimal compression ratio of the compressor is determined based on a value obtained by adding a compensation coefficient to the minimum compression ratio and the low pressure value of the refrigerant.

12. The air conditioner of claim 10, wherein the second condition that is based on the optimal compression ratio of the compressor is determined by adding a compensation coefficient to a minimum high pressure determined based on the minimum compression ratio and the low pressure value of the refrigerant.

13. The air conditioner of claim 1, wherein the third condition that is based on the outdoor temperature is determined by adding a compensation coefficient to a saturation pressure corresponding to the outdoor temperature.

14. The air conditioner of claim 1, wherein the third condition that is based on the outdoor temperature is determined based on a saturation pressure corresponding to a temperature obtained by adding a compensation coefficient to the outdoor temperature.

15. A control method of an air conditioner including a compressor configured to compress refrigerant and thereby discharge high pressure refrigerant gas, an outdoor heat exchanger in which the high pressure refrigerant gas is changed to refrigerant fluid, and an outdoor fan configured to blow outdoor air to the outdoor heat exchanger, the control method comprising:
determining an operation condition based on operation conditions including:
a first condition that is based on an installation environment of the air conditioner,
a second condition that is based on an optimal compression ratio of the compressor,
a third condition that is based on an outdoor temperature, and
a fourth condition that is based on a default temperature of the refrigerant or a default pressure of the refrigerant;
setting a highest value of the operation condition to be a target condition; and
controlling a pressure of the refrigerant or a temperature of the refrigerant based on the target condition,
wherein the first condition that is determined based on the installation environment of the air conditioner includes at least one of a length of a connection pipe connecting an indoor unit to an outdoor unit or a difference in pressure level between the outdoor unit and the indoor unit.

16. The control method of claim 15, wherein
the controlling of the pressure of the refrigerant includes obtaining a current pressure of the refrigerant; and
controlling the outdoor fan based on the current pressure of the refrigerant and the target condition.

17. The control method of claim 16, wherein the controlling of the outdoor fan includes increasing the number of revolutions of the outdoor fan while the current pressure of the refrigerant is higher than the target condition.

18. The control method of claim 16, wherein the obtaining of the current pressure of the refrigerant includes measuring the current pressure of the refrigerant using a pressure sensor provided between the compressor and the outdoor heat exchanger.

19. An air conditioner comprising:
an outdoor unit including a compressor;
an indoor unit including a decompressor, wherein the outdoor unit is coupled to the indoor unit so that the refrigerant is circulated between the outdoor unit and the indoor unit to be compressed by the compressor to a high pressure refrigerant gas and decompressed by the decompressor into a low pressure fluid; and
a controller configured to control a pressure of the refrigerant or a temperature of the refrigerant based on operation conditions including:
a first condition that is based on an installation environment of the air conditioner,
a second condition that is based on an optimal compression ratio of the compressor,
a third condition that is based on an outdoor temperature, and
a fourth condition that is based on a default temperature of the refrigerant or a default pressure of the refrigerant,
wherein the first condition that is determined based on the installation environment of the air conditioner includes at least one of a length of a connection pipe connecting an indoor unit to an outdoor unit or a difference in pressure level between the outdoor unit and the indoor unit.

* * * * *